(12) United States Patent
Murakami

(10) Patent No.: US 7,733,534 B2
(45) Date of Patent: Jun. 8, 2010

(54) IMAGE PROCESSING METHOD, IMAGE PROCESSING APPARATUS, IMAGE FORMING APPARATUS, AND RECORDING MEDIUM

(75) Inventor: Yoshinori Murakami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1052 days.

(21) Appl. No.: 11/412,478

(22) Filed: Apr. 26, 2006

(65) Prior Publication Data

US 2006/0238814 A1 Oct. 26, 2006

(30) Foreign Application Priority Data

Apr. 26, 2005 (JP) .............................. 2005-128461
Sep. 13, 2005 (JP) .............................. 2005-265812

(51) Int. Cl.
*H04N 1/405* (2006.01)

(52) U.S. Cl. .................. 358/3.13; 358/3.14; 358/3.16; 358/3.19; 345/596

(58) Field of Classification Search ....................... None
See application file for complete search history.

(56) References Cited

U.S. PATENT DOCUMENTS

| | | | | | |
|---|---|---|---|---|---|
| 5,642,439 | A * | 6/1997 | Sato et al. | .................. | 382/254 |
| 6,026,184 | A * | 2/2000 | Fukushima | ................. | 382/199 |
| 6,101,002 | A * | 8/2000 | Urasawa | .................... | 358/3.13 |
| 6,674,546 | B1 * | 1/2004 | Nakahara | .................... | 358/1.9 |
| 6,714,320 | B1 * | 3/2004 | Nakahara et al. | ........... | 358/3.13 |
| 6,731,400 | B1 * | 5/2004 | Nakamura et al. | ............ | 358/1.9 |
| 6,906,825 | B1 * | 6/2005 | Nakahara et al. | ............. | 358/1.9 |
| 6,934,057 | B1 * | 8/2005 | Namizuka | .................... | 358/2.1 |
| 7,580,156 | B2 * | 8/2009 | Kakutani | .................... | 358/3.13 |
| 2003/0058482 | A1 * | 3/2003 | Morimatsu | .................. | 358/457 |
| 2003/0151774 | A1 * | 8/2003 | Washio | ....................... | 358/3.13 |
| 2005/0105818 | A1 * | 5/2005 | Hoshi | .......................... | 382/254 |
| 2005/0219563 | A1 * | 10/2005 | Kakutani | .................... | 358/1.9 |
| 2006/0285167 | A1 * | 12/2006 | Washio | ....................... | 358/3.14 |
| 2007/0041054 | A1 * | 2/2007 | Kakutani | .................... | 358/3.16 |

FOREIGN PATENT DOCUMENTS

| | | |
|---|---|---|
| JP | 61-189774 | 8/1986 |
| JP | 2000-196885 | 7/2000 |
| JP | 2000-354164 | 12/2000 |
| JP | 2001-257893 | 9/2001 |
| JP | 2002-232708 | 8/2002 |

\* cited by examiner

*Primary Examiner*—Mark K Zimmerman
*Assistant Examiner*—Dung D Tran
(74) *Attorney, Agent, or Firm*—George W. Neuner; David G. Conlin; Edwards Angell Palmer & Dodge LLP

(57) ABSTRACT

In an image processing apparatus that performs a dither processing using a dither matrix based on the result of determination of the segmentation class to which the pixel to be processed belongs, to perform the dither processing, any of a plurality of pairs of threshold values is selected according to the result of determination of the segmentation class, and the selected pair of threshold values are compared with the value of the pixel to be processed, which are set so that in correspondence with each position of a dither matrix of a same configuration and a same size, a different dither processing is performed according to the result of determination of the segmentation class on part of the dither matrix and a same dither processing is performed irrespective of the result of determination of the segmentation class on the remainder of the dither matrix.

24 Claims, 24 Drawing Sheets

F I G. 1

|   |   |   | 30 | 22 | 34 |   |
|---|---|---|----|----|----|---|
| 28 | 20 | 32 | 38 | 2  | 6  |   |
| 36 | 0  | 4  | 18 | 10 | 14 | 26 |
| 16 | 8  | 12 | 24 | 29 | 21 | 33 |
|   | 31 | 23 | 35 | 37 | 1  | 5  |
|   | 39 | 3  | 7  | 17 | 9  | 13 | 25 |
|   |   | 19 | 11 | 15 | 27 |   |

| 0 | 4 | 2 | 6 |
|---|---|---|---|
| 8 | 12 | 10 | 14 |
| 3 | 7 | 1 | 5 |
| 11 | 15 | 9 | 13 |

| INPUT DENSITY VALUE x | OUTPUT VALUE |
|---|---|
| 0≦x<Th [i] [0] | Out [0] |
| Th [i] [0] ≦x<Th [i] [1] | Out [1] |
| Th [i] [1] ≦x<Th [i] [2] | Out [2] |
| Th [i] [2] ≦x<Th [i] [3] | Out [3] |
| Th [i] [3] ≦x<Th [i] [4] | Out [4] |
| Th [i] [4] ≦x<Th [i] [5] | Out [5] |
| Th [i] [5] ≦x<Th [i] [6] | Out [6] |
| Th [i] [6] ≦x<Th [i] [7] | Out [7] |
| Th [i] [7] ≦x<Th [i] [8] | Out [8] |
| Th [i] [8] ≦x<Th [i] [9] | Out [9] |
| Th [i] [9] ≦x<Th [i] [10] | Out [10] |
| Th [i] [10] ≦x<Th [i] [11] | Out [11] |
| Th [i] [11] ≦x<Th [i] [12] | Out [12] |
| Th [i] [12] ≦x<Th [i] [13] | Out [13] |
| Th [i] [13] ≦x<Th [i] [14] | Out [14] |
| Th [i] [14] ≦x≦255 | Out [15] |

FIG. 12

|    |    |    | 15 | 11 | 17 |    |
|----|----|----|----|----|----|----|
| 14 | 10 | 16 | 19 | 1  | 3  |    |
| 18 | 0  | 2  | 9  | 5  | 7  | 13 |
| 8  | 4  | 6  | 12 |    |    |    |

FIG. 22

IMAGE PROCESSING METHOD, IMAGE PROCESSING APPARATUS, IMAGE FORMING APPARATUS, AND RECORDING MEDIUM

CROSS-REFERENCE TO RELATED APPLICATIONS

This Nonprovisional application claims priority under 35 U.S.C. §119(a) on Patent Applications No. 2005-128461 filed in Japan on Apr. 26, 2005 and No. 2005-265812 filed in Japan on Sep. 13, 2005, the entire contents of which are hereby incorporated by reference.

BACKGROUND OF THE INVENTION

The present invention relates to an image processing method, an image processing apparatus and an image forming apparatus that perform a dither processing using a dither matrix based on the result of determination of the segmentation class to which the pixel to be processed belongs, and to a recording medium where a computer program is recorded for causing a computer to perform the dither processing using the dither matrix based on the result of determination of the segmentation class to which the pixel to be processed belongs.

In recent years, since the digitization of OA apparatuses has rapidly proceeded and the demand for color image output has increased, output apparatuses such as electrophotographic digital color copiers and inkjet and thermal transfer printers have become widespread. For example, image information inputted from input apparatuses such as digital cameras and image scanners and image information created on computers are outputted by using these output apparatuses. In these output apparatuses, a pseudo tone reproduction processing is frequently performed on the inputted image information.

A method of the pseudo tone reproduction processing is the multi-level dither method. For example, on the pixels of a dither matrix as shown in FIG. 1 (here, the numerals in the cells represent the order in which higher output values are assigned), quantization is performed based on the comparison of the pixel values and a plurality of corresponding threshold values, and one of a plurality of output values is outputted or an output value converted based on a conversion table is outputted.

A technology has been proposed such that by using a dither matrix of a concentrated type having a number, k (k≧2), of cores, forming a screen angle and making the frequency of occurrence of dots whose densities are not the highest level not more than k within the dither matrix, an improvement in reproducibility and the stabilization of image quality such as smooth tone representation are attained and by making the density level difference between dots not more than 1 by uniformly increasing the density within the dither matrix, resolution is maintained within a permissible range and the halftone dots are well-balancedly expressed to thereby prevent the screen angle from disappearing (see, for example, Japanese Patent Application Laid-Open No. 61-189774 (1986)).

For the pixels determined to be the edge area by the segmentation processing, in order to clearly reproduce characters and thin lines, unlike the multi-level dither processing for the area other than the edge area, for example, the same tone correction processing is applied to all the pixels by using a 1×1 dither matrix or a multi-level dither processing that makes the density level difference between dots not more than 1 is applied to the same input value.

As a technique to make moire difficult to occur in the halftone area while reproducing a lower density in the multi-level dither processing, a technique has been proposed such that in the low density part, the output values are distributed to the pixels in a predetermined order within the dither matrix so as to locally increase and in the high density part, the output values are distributed to the pixels one by one in a predetermined order within the dither matrix so as to uniformly increase (for example, Japanese Patent Application Laid-Open No. 2001-257893).

BRIEF SUMMARY OF THE INVENTION

When a multi-level dither processing to produce an output as shown in FIG. 2 (here, the numerals in the cells represent output values; the upper left side is low in density and the lower right side, high in density) from the low density to the high density in a dither matrix comprising four submatrices as shown in FIG. 1 is performed on all the pixels, as shown in the conceptual view of the screen angle shown in FIG. 3, since a screen angle (the broken line of FIG. 3) is formed and the dot-to-dot distances are not short, jaggies are caused in character and thin line parts. In the technique of Japanese Patent Application Laid-Open No. 61-189774 (1986), jaggies are also caused in character and thin line parts.

When a multi-level dither processing to produce an output as shown in FIG. 5 (here, the numerals in the cells are output values; the upper left side is low in density and the lower right side, high in density) from the low density to the high density is performed by using a dither matrix shown in FIG. 4 (here, the numerals in the cells represent the order in which higher output values are assigned), although jaggies are more difficult to recognize than in the dither matrix of FIG. 1 since the screen angle is 0 degree and the dot-to-dot distances are short, the output value changes in a cycle of one line such that only one line is dark or that three lines are dark, so that the thickness of thin lines extending in a main scanning direction (the horizontal direction in the figure) appears different according to the reading position.

Since it is difficult that the reproduced density in the edge area and that in the area other than the edge area coincide with each other and the reproduced resolution is different between the edge area and the area other than the edge area even when the multi-level dither processing as shown in FIG. 2 is applied to the pixels determined to be the area other than the edge area by the segmentation processing, the same tone correction processing is applied to all the pixels determined to be the edge area or the multi-level dither processing that makes the density level difference between dots not more than 1 is applied to the same input value, the switching of the processing is perceived. Even when the multi-level dither processing as shown in FIG. 5 is performed on the edge area by using the dither matrix as shown in FIG. 4 where the tone reproducibility is not very poor and the reproduced resolution is comparatively excellent, since the reproduced resolution is different although the reproduced densities readily coincide with each other, the switching of the processing is perceived.

When the technique of Japanese Patent Application Laid-Open No. 2001-257893 is applied to all the pixels, although images with jaggies in character and thin line parts being suppressed can be outputted, a larger number of pixels output unstable dots, so that more nonuniformity is perceived in the output image.

The present invention is made in view of such circumstances, and an object thereof is to provide an image processing method capable of suppressing the image quality degradation due to the switching of the dither processing by, by use of a dither matrix of the same configuration and the same size, performing a different dither processing according to the result of determination of the segmentation class on part of the dither matrix.

Another object of the present invention is to provide an image processing method capable of reducing the memory capacity necessary for storing a plurality of pairs of threshold values by selecting any of a plurality of dither matrices comprising a combination of different numbers of dither matrices of the same configuration and the same size according to the result of determination of the segmentation class and performing a different dither processing according to the result of determination of the segmentation class on part of the dither matrix of the same configuration and the same size included in the selected dither matrix.

Another object of the present invention is to provide an image processing method, an image processing apparatus, an image forming apparatus, a computer program and a recording medium capable of performing the most suitable dither processing according to the area and suppressing the image quality degradation due to the switching of the threshold value by, to perform the dither processing, selecting, according to the result of determination of the segmentation class, any of a plurality of pairs of threshold values that are set so that in correspondence with each position of the dither matrix of the same configuration and the same size, a different dither processing is performed according to the result of determination of the segmentation class on part of the dither matrix and a same dither processing is performed irrespective of the result of determination of the segmentation class on the remainder of the dither matrix, and comparing the selected pair of threshold values with the value of the pixel to be processed.

Another object of the present invention is to provide an image processing method capable of performing the most suitable dither processing for each of the edge area and the area other than the edge area by selecting a pair of threshold values according to whether the result of determination of the segmentation class is the edge area or not.

Another object of the present invention is to provide an image processing method capable of suppressing the image quality degradation due to the switching of a plurality of pairs of threshold values by increasing the pixel value which is the dither processing result of each position of the dither matrix of the same configuration and the same size, with the same position as a starting point, irrespective of the result of determination of the segmentation class according to the value of the pixel to be processed.

Another object of the present invention is to provide an image processing method capable of suppressing the occurrence of jaggies in the edge area such as characters by, when the result of determination of the segmentation class is the edge area, increasing the pixel value of the starting point of the dither matrix of the same configuration and the same size to a predetermined value according to the value of the pixel to be processed, and then, uniformly increasing the pixel values of the other positions to the predetermined value.

Another object of the present invention is to provide an image processing method capable of more suppressing the occurrence of jaggies and isolated points in the edge area such as characters by, when a plurality of dither matrices of the same configuration and the same size constitute a group and the result of determination of the segmentation class is the edge area, increasing the pixel value of a predetermined starting point of the starting points of the dither matrices to a predetermined value according to the value of the pixel to be processed, and then, uniformly increasing the pixel values of the other starting points and the other positions of the dither matrices to the predetermined value.

Another object of the present invention is to provide an image processing method capable of suppressing the position nonuniformity of the tone characteristic of the edge area while suppressing the image quality degradation due to the switching of a plurality of pairs of threshold values by uniformly arranging the predetermined starting point.

Another object of the present invention is to provide an image processing method improving the gradation of the area other than the edge area by, when the result of determination of the segmentation class is not the edge area, increasing the pixel value of the starting point of the dither matrix of the same configuration and the same size to a predetermined value according to the value of the pixel to be processed, and then, increasing the pixel values of the other positions to the predetermined value position by position.

Another object of the present invention is to provide an image processing method improving the processing speed of the tone correction information generation by performing the tone correction based on the tone correction information common to pixels irrespective of the result of determination of the segmentation class.

Another object of the present invention is to provide an image processing method, an image processing apparatus, an image forming apparatus, a computer program and a recording medium capable of performing the dither processing at high speed by selecting, according to the result of determination of the segmentation class, any of a plurality of pieces of data representative of the relation between each pair of the pixel value before the processing and the pixel value after the processing of the dither processing using a plurality of pairs of threshold values, and performing the dither processing based on the selected piece of data representative of the relation.

In an image processing method according to the present invention in which a dither processing using a dither matrix is performed based on the result of determination of the segmentation class to which the pixel to be processed belongs, by use of a dither matrix of the same configuration and the same size with a plurality of pairs threshold values, a different dither processing is performed according to the result of determination of the segmentation class on part of the dither matrix. Consequently, the dither processing most suitable for the area can be performed on the part. Moreover, since the different dither processing according to the result of determination of the segmentation class is performed not on all but on part and the different dither processing according to the result of determination of the segmentation class is not performed on the remainder of the dither matrix, the switching of the dither matrix is inconspicuous, so that the image quality degradation due to the switching of the dither processing can be suppressed.

In an image processing method according to the present invention in which a dither processing using a dither matrix is performed based on the result of determination of the segmentation class to which the pixel to be processed belongs, any of a plurality of dither matrices comprising a combination of different numbers of dither matrices (hereinafter, referred to as submatrices) of the same configuration and the same size is selected according to the result of determination of the segmentation class, and a different dither processing is performed according to the result of determination of the segmentation class on part of the dither matrix of the same configuration and the same size included in the selected dither matrix. Consequently, the memory capacity necessary for storing a plurality of pairs of threshold values can be reduced by reducing the number of combined submatrices. In areas not occupying a large continuous area, even if the tone reproducibility is slightly inferior, its influence on the quality of the output image is comparatively small. Therefore, in the dither matrix used for the dither processing of such an area, no problem arises if the number of submatrices is reduced. In the continuous tone area, since more emphasis is placed on the tone characteristic, the number of combined submatrices is increased.

In an image processing method according to the present invention, to perform the dither processing, any of a plurality of pairs of threshold values is selected according to the result of determination of the segmentation class, and the selected pair of threshold values are compared with a value of the pixel to be processed, which are set so that in correspondence with each position of the dither matrix of the same configuration and the same size, a different dither processing is performed according to the result of determination of the segmentation class on part of the dither matrix and the same dither processing is performed irrespective of the result of determination of the segmentation class on the remainder of the dither matrix. Consequently, in the part of the dither matrix, the most suitable dither processing according to the area can be performed, and in the remainder thereof, the image quality degradation due to the switching of the threshold value can be suppressed by performing the common dither processing irrespective of the area. Here, the above-described dither processing can be performed not only by the image processing apparatus or the image forming apparatus that forms an image onto a sheet but also by a computer. When the above-described processing is performed by a computer, a computer program that executes the above-described processing is provided to the computer, for example, by recording the program onto a recording medium.

In an image processing method according to the present invention, the pair of threshold values are selected according to whether the result of determination of the segmentation class is an edge area or not. Consequently, the dither processing suitable for each of the edge area such as characters and the area other than the edge area such as the halftone area and the continuous tone area can be performed.

In an image processing method according to the present invention, the pixel value which is the dither processing result of each position of the dither matrix of the same configuration and the same size with one threshold values is increased with a starting point which is the same position as the one with another threshold values irrespective of the result of determination of the segmentation class according to the value of the pixel to be processed. Consequently, since a fixed screen angle is formed irrespective of the result of determination of the segmentation class and the output value of the starting point is a similar value irrespective of the result of determination of the segmentation class, the switching of the dither processing due to the switching of the threshold value is inconspicuous, so that the image quality degradation due to the switching of a plurality of pairs of threshold values can be suppressed.

In an image processing method according to the present invention, when the result of determination of the segmentation class is an edge area, the pixel value of the starting point of the dither matrix of the same configuration and the same size is increased to a predetermined value according to the value of the pixel to be processed, and then, the pixel values of the other positions of the dither matrix are uniformly increased to the predetermined value. Consequently, the occurrence of jaggies in the edge area such as characters can be suppressed.

In an image processing method according to the present invention, when a plurality of dither matrices of the same configuration and the same size constitute a group and the result of determination of the segmentation class is the edge area, the pixel value of a predetermined starting point of the starting points of the dither matrices is increased to a predetermined value according to the value of the pixel to be processed, and then, the pixel values of the other starting points and the other positions of the dither matrices are uniformly increased to the predetermined value. Consequently, although the gradation of the edge area is slightly low, the occurrence of jaggies and isolated points in the edge area such as characters can be more suppressed.

In an image processing method according to the present invention, the predetermined starting point is uniformly distributed. Consequently, the position nonuniformity of the tone characteristic of the edge area can be suppressed while the image quality degradation due to the switching of a plurality of pairs of the threshold values is suppressed.

In an image processing method according to the present invention, when the result of determination of the segmentation class is not the edge area, the pixel value of the starting point of the dither matrix of the same configuration and the same size is increased to a predetermined value according to the value of the pixel to be processed, and then, the pixel values of the other positions of the dither matrix are increased to the predetermined value position by position. Consequently, the gradation of the area other than the edge area such as the halftone area or the continuous tone area is improved.

In an image processing method according to the present invention, tone correction is performed based on tone correction information common to pixels irrespective of the result of determination of the segmentation class. Consequently, the speed of the processing to generate the tone correction information is improved compared with when the tone correction information is prepared for each result of determination of the segmentation class and switching is made, and the memory capacity for storing the tone correction information can be reduced. Moreover, since the tone correction is performed based on the common tone correction information, the switching of the dither processing is inconspicuous.

In an image processing method according to the present invention, to perform the dither processing, any of a plurality of pieces of data representative of the relation between the pixel value before the dither processing and the pixel value after the dither processing is selected according to the result of determination of the segmentation class, and the value of the pixel to be processed is converted based on the selected piece of data representative of the relation, which pieces of data are set so that a different dither processing is performed according to the result of determination of the segmentation class on part of the dither matrix of the same configuration and the same size and a same dither processing is performed irrespective of the result of determination of the segmentation class on the remainder of the dither matrix. In the present invention, to perform the dither processing, the data representative of the relation between each pair of the pixel value before the processing and the pixel value after the processing of the dither processing using a plurality of pairs of threshold values is previously stored in the storage section, any of the data representative of the relation is selected according to the result of determination of the segmentation class, and the value of the pixel to be processed is converted based on the selected data representative of the relation, so that it is unnecessary to perform the comparison with the threshold value. Consequently, the dither processing can be performed at high speed. Here, the above-described dither processing can be performed not only by the image processing apparatus or the image forming apparatus that forms an image onto a sheet but also by a computer. When the processing is performed by a computer, a computer program that executes the processing is provided to the computer, for example, by recording the computer program onto a recording medium.

In an image processing apparatus according to the present invention that performs a dither processing using a dither matrix based on the result of determination of the segmentation class to which the pixel to be processed belongs, the following are provided: a storage section that stores a plurality of pairs of threshold values that are set so that in correspondence with each position of a dither matrix of the same configuration and the same size, a different dither processing is performed according to the result of determination of the segmentation class on part of the dither matrix and a same dither processing is performed irrespective of the result of determination of the segmentation class on the remainder of the dither matrix; and a selection section that selects any of the pairs of threshold values stored in the storage section according to the result of determination of the segmentation class, and to perform the dither processing, the pair of threshold values selected by the selection section are compared with a value of the pixel to be processed.

In an image processing apparatus according to the present invention that performs a dither processing using a dither matrix based on the result of determination of the segmentation class to which the pixel to be processed belongs, the following are provided: a storage section that stores a plurality of pieces of data representative of the relation between the pixel value before the dither processing and the pixel value after the dither processing which pieces of data are set so that a different dither processing is performed according to the result of determination of the segmentation class on part of a dither matrix of the same configuration and the same size and a same dither processing is performed irrespective of the result of determination of the segmentation class on the remainder of the dither matrix; and a selection section that selects any of the pieces of data representative of the relation stored in the storage section according to the result of determination of the segmentation class, and to perform the dither processing, the value of the pixel to be processed is converted based on the piece of data representative of the relation selected by the selection section.

An image forming apparatus according to the present invention is provided with the above-described image processing apparatus of the present invention and an image output apparatus that forms an image processed by the image processing apparatus, on a sheet.

In an recording medium according to the present invention where a computer program is recorded for performing a dither processing using a dither matrix based on a result of determination of the segmentation class to which the pixel to be processed belongs, the computer program has the steps of causing a computer to select, according to the result of determination of the segmentation class, any of a plurality of pairs of threshold values that are set so that in correspondence with each position of a dither matrix of the same configuration and the same size, a different dither processing is performed according to the result of determination of the segmentation class on part of the dither matrix and a same dither processing is performed irrespective of the result of determination of the segmentation class on the remainder of the dither matrix; and causing the computer to compare the selected pair of threshold values with the value of the pixel to be processed, to perform the dither processing.

In a recording medium according to the present invention where a computer program is recorded for performing a dither processing using a dither matrix based on the result of determination of the segmentation class to which the pixel to be processed belongs, the computer program has the steps of causing a computer to select, according to the result of determination of the segmentation class, any of a plurality of pieces of data representative of the relation between the pixel value before the dither processing and the pixel value after the dither processing which pieces of data are set so that a different dither processing is performed according to the result of determination of the segmentation class on part of a dither matrix of the same configuration and the same size and a same dither processing is performed irrespective of the result of determination of the segmentation class on the remainder of the dither matrix; and causing the computer to convert the value of the pixel to be processed based on the selected piece of data representative of the relation, to perform the dither processing.

The above and further objects and features of the invention will more fully be apparent from the following detailed description with accompanying drawings.

BRIEF DESCRIPTION OF THE SEVERAL VIEWS OF THE DRAWINGS

FIG. 1 is a view showing an example of the dither matrix used for the multi-level dither processing;

Figure 3:
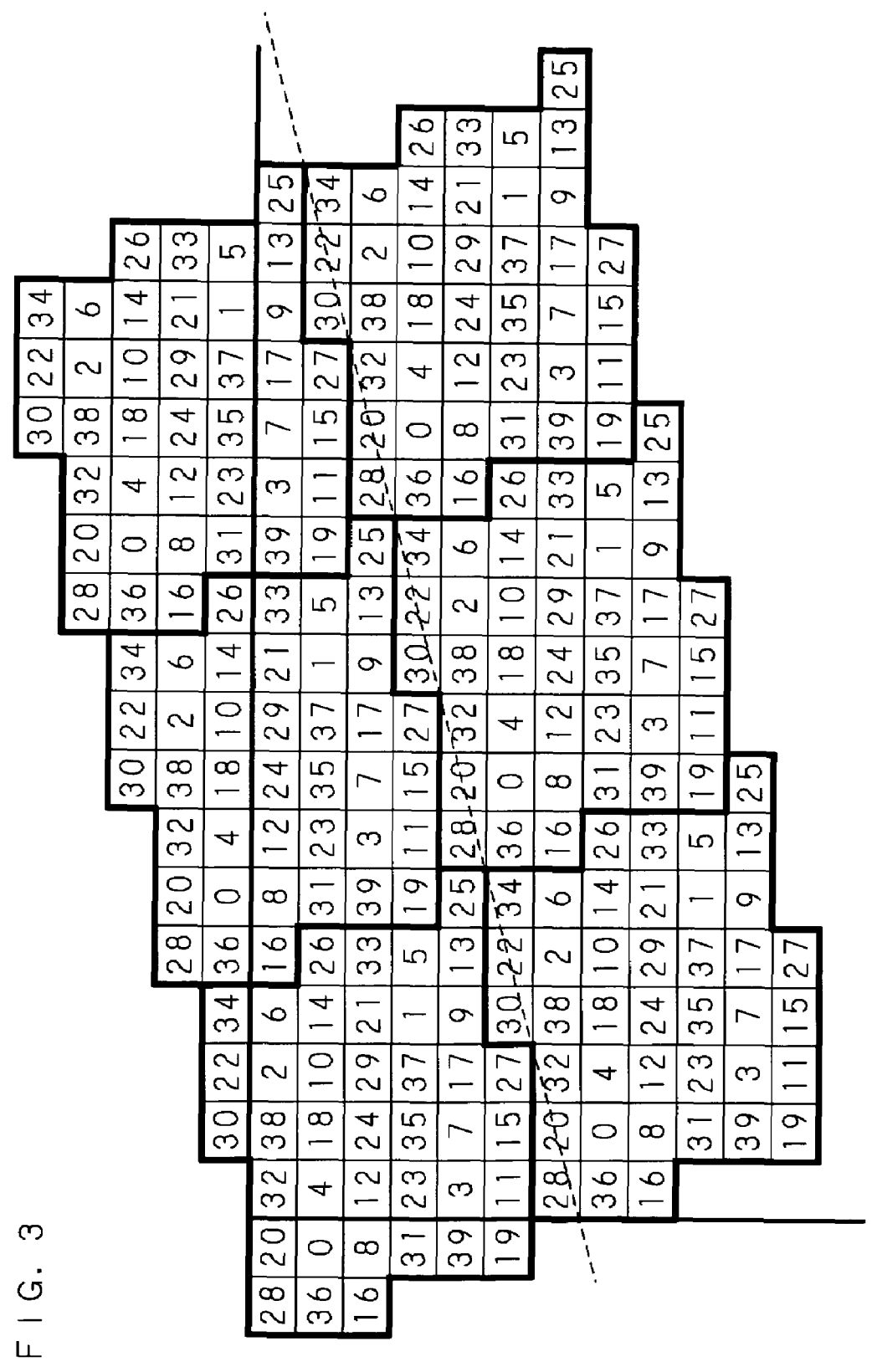

FIG. 3 is a conceptual view of the screen angle;

Figure 4:
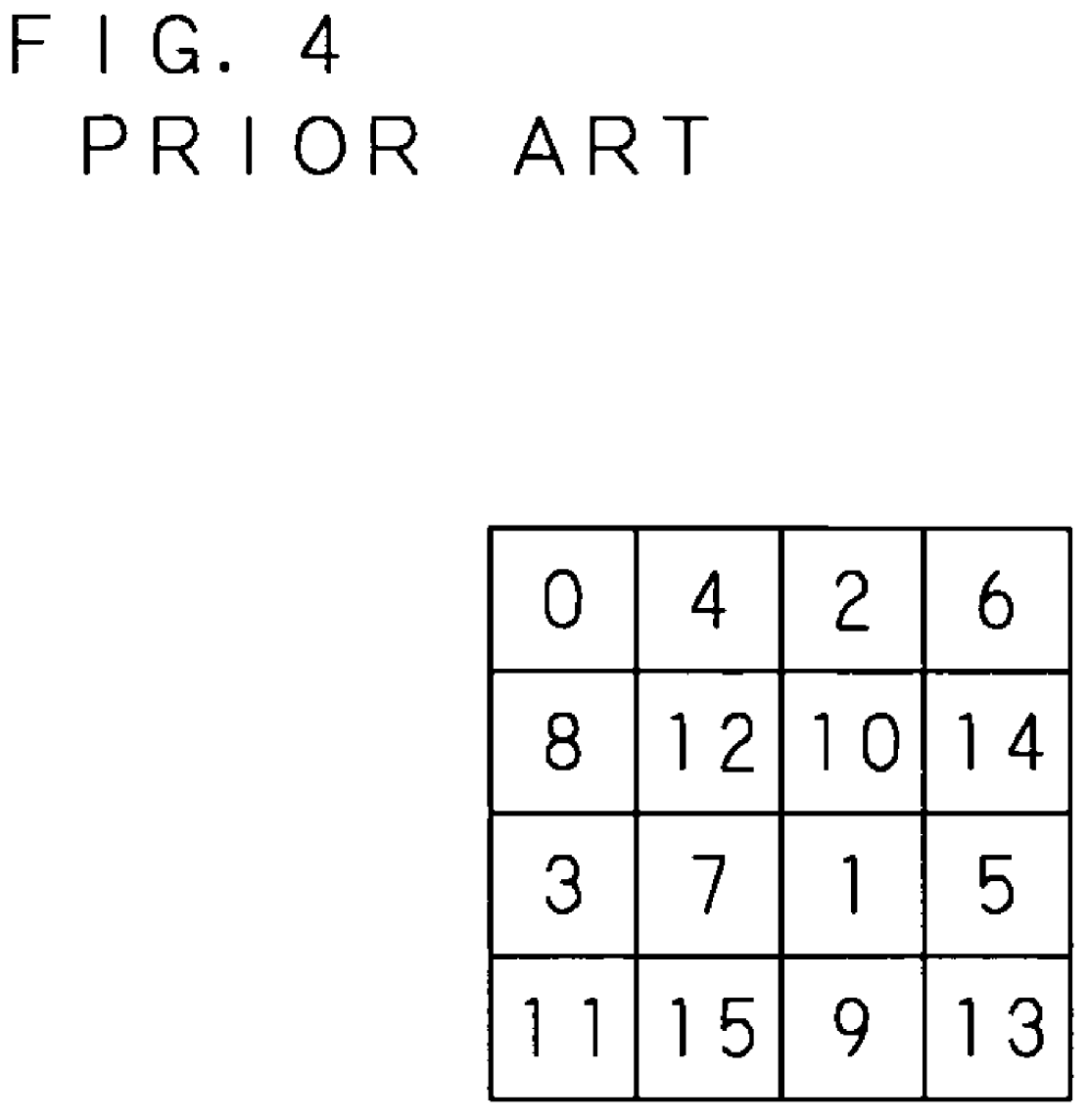

FIG. 4 is a view showing an example of the conventional dither matrix;

Figure 5:
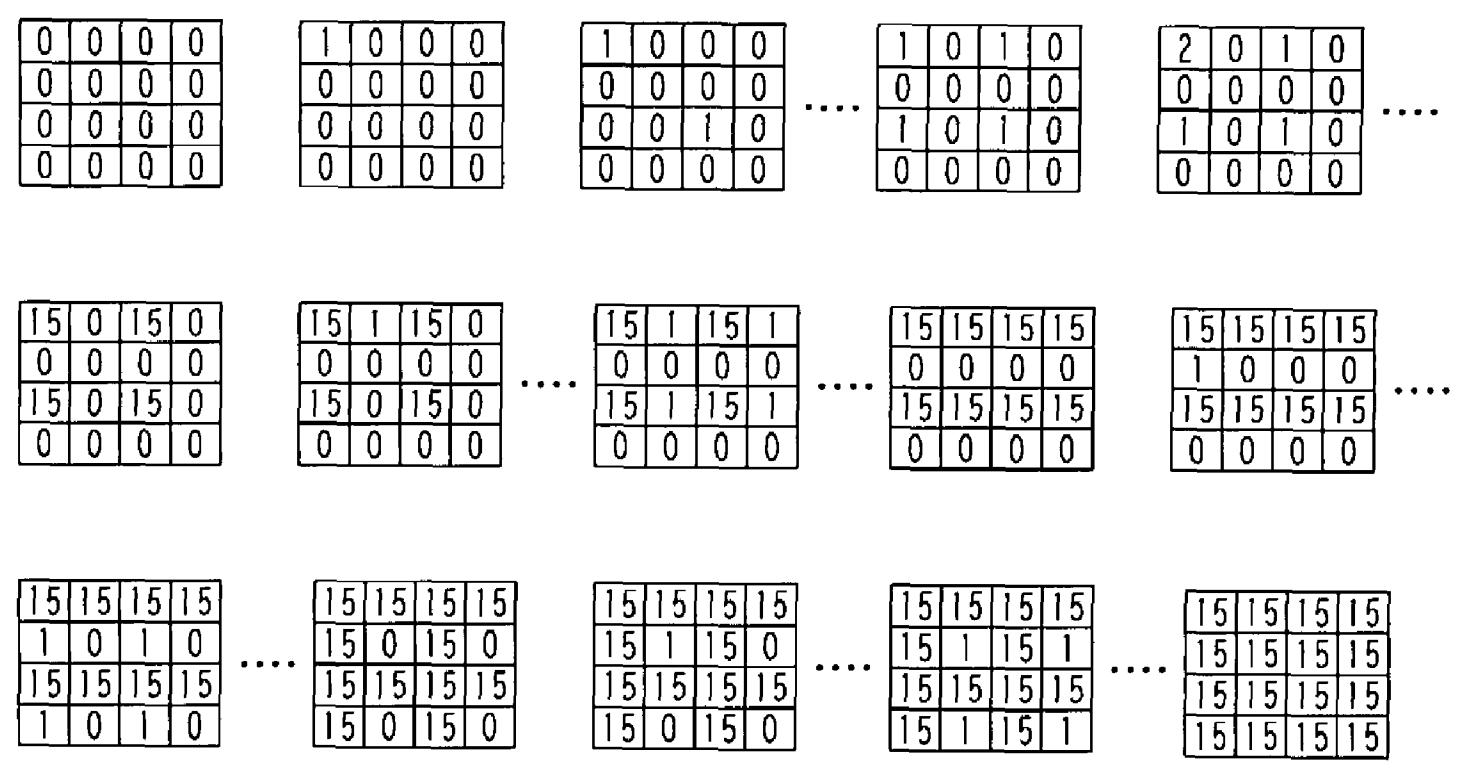

FIG. 5 is a view showing an example of the output values from the low density to the high density when the conventional dither matrix shown in FIG. 4 is used;

FIG. 8 is a table showing an example of the association among an input density value (pixel density value), a threshold value and an output value;

FIG. 12 is a view showing another example of the dither matrix used for the multi-level dither processing;

FIG. 22 is a view for explaining a method of selecting a submatrix where the output value of the number which is the core is increased first, from among a plurality of submatrices;

DETAILED DESCRIPTION OF THE INVENTION

Hereinafter, the present invention will be concretely described with reference to the drawings showing embodiments thereof.

First Embodiment

Figure 6:
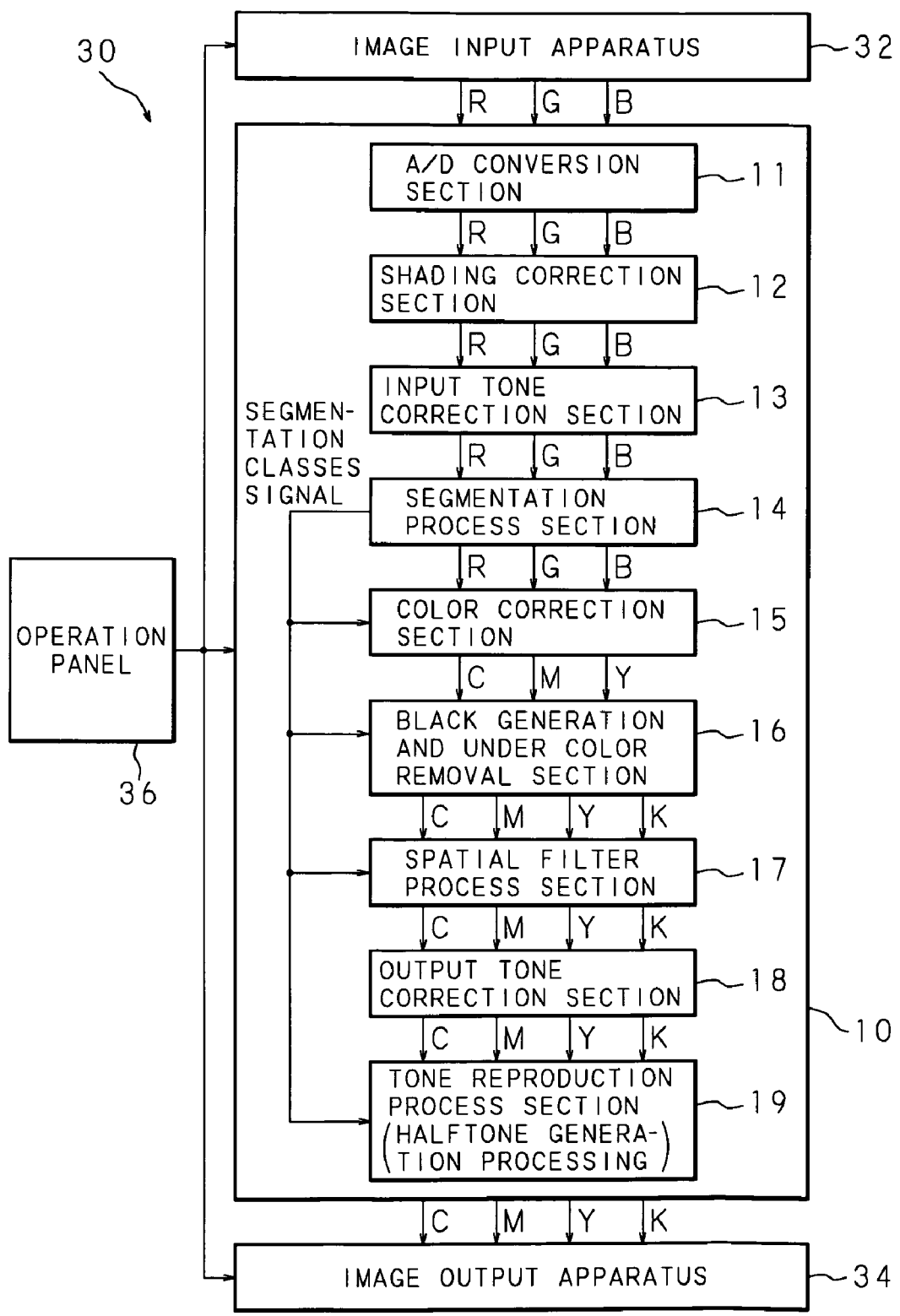
FIG. 6 is a block diagram showing the schematic structure of a digital color copier (image forming apparatus) having an image processing apparatus according to the present invention.

FIG. 6 is a block diagram showing the schematic structure of a digital color copier (image forming apparatus) 30 having an image processing apparatus 10 according to the present invention. The digital color copier 30 has an image input apparatus 32, the image processing apparatus 10, an image output apparatus (image forming apparatus) 34, and an operation panel 36. The image processing apparatus 10 has an A/D (analog to digital) conversion section 11, a shading correction section 12, an input tone correction section 13, a segmentation process section 14, a color correction section 15, a black generation and under color removal section 16, a spatial filter process section 17, an output tone correction section 18, and a tone reproduction process section 19.

The image input apparatus 32 includes, for example, an image scanner having a CCD (charge coupled device), reads the reflected light image by the CCD from the paper where a document image is recorded as analog RGB (red, green, blue) signals, and outputs them to the image processing apparatus 10. The analog RGB signals read by the image input apparatus 32 are transmitted to the image processing apparatus 10 in the order of the A/D conversion section 11, the shading correction section 12, the input tone correction section 13, the segmentation process section 14, the color correction section 15, the black generation and under color removal section 16, the spatial filter process section 17, the output tone correction section 18 and the tone reproduction process section 19, and in the end, digital CMYK (cyan, magenta, yellow, black) signals are outputted to the image output apparatus 34.

The A/D conversion section 11 converts the inputted analog RGB signals into digital RGB signals. The shading correction section 12 performs the processing to remove various distortions caused in the illumination system, the image forming system and the image capturing system of the image input apparatus 32, on the digital RGB signals (hereinafter, referred to as RGB signals) transmitted from the A/D conversion section 11. The input tone correction section 13 adjusts the color balance of the RGB signals (RGB reflectance signals) from which various distortions are removed by the shading correction section 12, and converts the RGB signals into signals, such as density signals, that are easy-to-handle by the image processing system adopted by the image processing apparatus 10.

The segmentation process section 14 segments the pixels in the input image into areas such as a character area (edge area), a halftone area and a picture area based on the inputted RGB signals. The segmentation process section 14 outputs segmentation classes signal (result of determination of segmentation class) representing which areas the pixels belong to, to the color correction section 15, the black generation and under color removal section 16, the spatial filter process section 17, the output tone correction section 18 and the tone reproduction process section 19, and outputs the RGB signals inputted from the input tone correction section 13, to the succeeding color correction section 15 as they are.

As the segmentation processing, for example, the largest density difference which is the difference between the lowest density value (lowest pixel value) and the highest density value (highest pixel value) in an n×m block (for example, 15×15) including the current pixel to be processed and the sum total density busyness which is the sum total of the absolute values of the differences in density (differences in pixel value) between the adjoining pixels are calculated and compared with a plurality of predetermined threshold values to thereby segment the pixels into a page background area, a photographic paper (picture) area (continuous tone area; images outputted by thermal and dye-sublimation printers also correspond to the continuous tone area), a character area (edge area) or a halftone area (see, for example, Japanese Patent Application Laid-Open No. 2002-232708).

In the density distribution of the page background area, normally, the largest density difference and the sum total density busyness are both extremely small because the density change is small. In the density distribution of the photographic paper area, since the density changes smoothly, the largest density difference and the sum total density busyness are both small but slightly larger than those in the page background area. In the density distribution of the halftone area, the largest density difference varies among the halftone dots and the density changes by the number of halftone dots in the sum total density busyness, so that the ratio of the sum total density busyness to the largest density difference is high. Therefore, when the sum total density busyness is higher than the product of the largest density difference and a character/halftone determination threshold value (one of the above-mentioned threshold values), the current pixel is determined to be the halftone area. In the density distribution of the character area, although the largest density difference is large and the sum total density busyness is high accordingly, since the density change is smaller than that in the halftone area, the sum total density busyness is lower than that in the halftone area. Therefore, when the sum total density busyness is lower than the product of the largest density difference and the character/halftone determination threshold value, the current pixel is determined to be the character area (edge area).

Therefore, first, the comparison between the calculated largest density difference and the largest density difference threshold value and the comparison between the calculated sum total density busyness and the sum total density busyness threshold value are performed. When the largest density difference is smaller than the highest density difference threshold value and the sum total density busyness is lower than the sum total density busyness threshold value, the current pixel is determined to be the page background/photographic paper area, and in the cases other than this, the current pixel is determined to be the character/halftone area. When the current pixel is determined to be the page background/photographic paper area, the comparison between the calculated largest density difference and a page background/photographic paper determination threshold value is performed. When the largest density difference is smaller, the current pixel is determined to be the page background area, and when the largest density difference is larger, the current pixel is determined to be the photographic paper area. When the current pixel is determined to be the character/halftone area, the comparison between the calculated sum total density busyness and the largest density difference multiplied by the character/halftone determination threshold value is performed. When the sum total density busyness is lower, the current pixel is determined to be the character area (edge area), and when the sum total density busyness is higher, the current pixel is determined to be the halftone area.

The color correction section 15 performs, to faithfully reproduce the color, the processing to remove the color muddiness based on the spectral characteristic of the CMY color material containing unnecessary absorption components. Examples of the method of the processing include a method preparing the association between the input RGB signals and the output CMY signals as an LUT (look-up table) and a color masking method using a transformation matrix as follows:

$$\begin{pmatrix} C \\ M \\ Y \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix}$$

When the color masking method is used, the RGB data when the color patch of the L*a*b* value (CIE1796 L*a*b* signal (CIE stands for Commission International de l'Eclairage, L* for lightness, a* for redness-greeness and b* for yellowness-blueness)) the same as the L*a*b* value of the color outputted when given CMY data is supplied to the image output apparatus 34 is read by the image input apparatus 32, and the CMY data supplied to the image output apparatus 34 are provided in a multiplicity of pairs, and from the combinations thereof, the coefficients of the transformation matrix from $a_{11}$ to $a_{33}$ are calculated. Using these coefficients, color correction is performed. To enhance the precision, a second- or higher-order term is added.

The black generation and under color removal section 16 performs black generation to generate a black (K) signal from the three color signals of CMY having undergone the color correction and the processing to generate new CMY signals by subtracting the part where the original CMY signals overlap, and converts the three color signals of CMY into four color signals of CMYK. The spatial filter process section 17 processes the image of the CMYK signals inputted from the black generation and under color removal section 16 so that the blur and granularity degradation of the output image are prevented by correcting the spatial frequency characteristic by performing the spatial filter processing using a digital filter based on the segmentation classes signal. The output tone correction section 18 performs the output tone correction processing to convert density signals and the like into a halftone area ratio which is a characteristic value of the image output apparatus 34. The tone reproduction process section 19 performs, based on the segmentation classes signal, the tone reproduction processing on the image of the CMYK signals so that the tone of the image can be pseudly reproduced in the end.

For example, in the area determined to be the character area (edge area) by the segmentation process section 14, in order to increase the reproducibility of, particularly, black characters or color characters, the high-frequency components are enhanced by the sharpness enhancement processing in the spatial filter processing by the spatial filter process section 17. At the same time, the tone reproduction process section 19 performs the binarizing or value multiplexing processing on a high-resolution screen suitable for the reproduction of the high-frequency components. On the area determined to be the halftone area by the segmentation process section 14, the low-pass filter processing to remove the input halftone components is performed by the spatial filter process section 17, and the binarizing or multi-level processing is performed on a screen where emphasis is placed on gradation, by the tone reproduction process section 19. On the area determined to be the photographic paper area by the segmentation process section 14, the binarizing or value multiplexing processing is performed on a screen where emphasis is placed on tone reproducibility, by the tone reproduction process section 19.

In the present invention, the tone reproduction process section 19 performs a different multi-level dither processing according to the result of the segmentation as mentioned later. Here, the different dither processing means a dither processing using a different threshold value. Although the image data comprises the density values of the colors of CMYK, since a similar multi-level dither processing is performed irrespective of the color components of the image data, in the description that follows, only the processing for the density value (pixel value) of one color component will be explained, and the explanation of the processing for the other color components is omitted.

The image data having undergone the above-described processings is temporarily stored in a non-illustrated storage device, read out at a predetermined timing, and outputted to the image output apparatus 34. The image output apparatus 34 outputs the color image based on the image data onto a recording medium (for example, paper). While a color image output apparatus using the electrophotographic method or the inkjet method can be named as an example, the image output apparatus 34 is not specifically limited thereto. The above-described processings are controlled by a non-illustrated CPU (central processing unit). The operation panel 36 comprises, for example, a touch panel where a display section such as a liquid crystal display and an operation section such as setting buttons are integrated with each other. The operations of the image input apparatus 32, the image processing apparatus 10 and the image output apparatus 34 are controlled by the CPU based on the information inputted from the operation panel 36.

Figure 7:
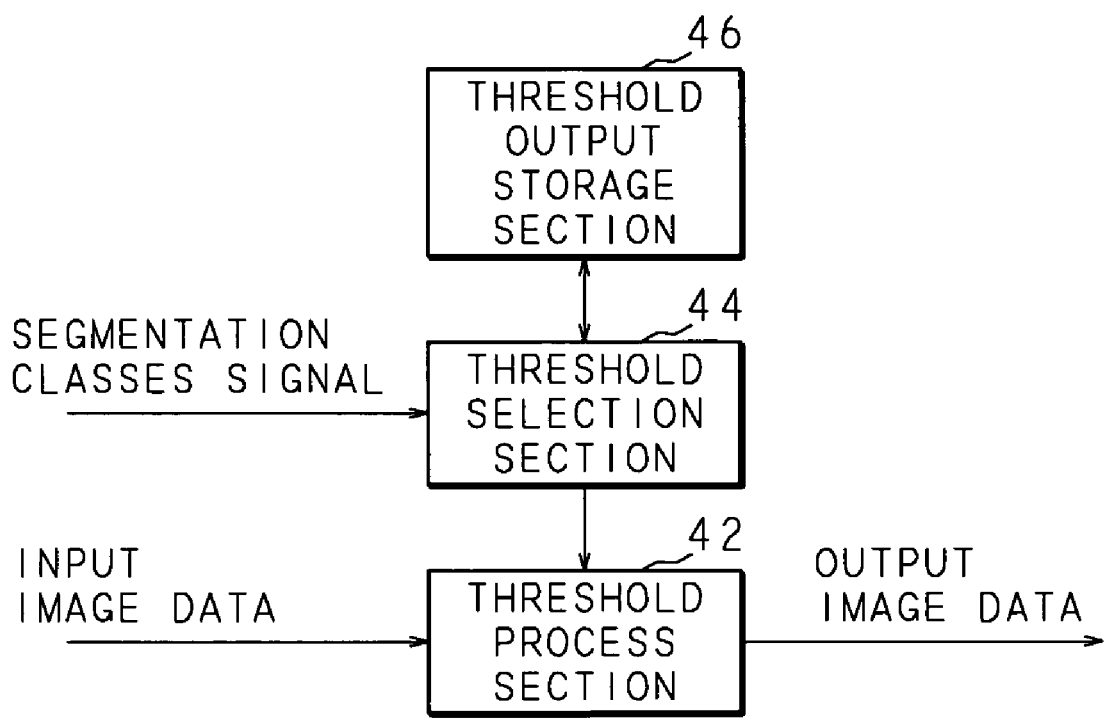
FIG. 7 is a block diagram showing an example of the structure of the relevant part of a tone reproduction process section.

FIG. 7 is a block diagram showing an example of the structure of the relevant part of the tone reproduction process section 19. The tone reproduction process section 19 has a threshold process section 42, a threshold selection section (selector) 44 and a threshold output storage section (memory) 46. The threshold output storage section 46 stores 15 threshold values and 16 output values for each pixel position within the dither matrix used for the dither processing. Here, the threshold values and the output values are stored for each of the segmentation results such as the edge area (for example, the character area) and the area other than the edge area (for example, the halftone area, the photographic paper area, the page background area). To the threshold selection section 44, the segmentation classes signal is inputted, and based on the segmentation classes signal, the threshold selection section 44 selects the threshold values and the output values for the edge area or the threshold value and the output value for the area other than the edge area, reads them from the threshold output storage section 46, and transmits the read threshold and output values to the threshold selection section 44. While in the present embodiment, the threshold values and the output values for the area other than the edge area are used for the pixels belonging to the halftone area, threshold values and output values for the halftone area may be separately prepared so that they are selected and used in the case of the halftone area.

The threshold process section 42 performs, on the pixels of the input image data, the comparison with a plurality of (for example, 15) threshold values corresponding to the positions to which the high output values (pixel values) within the dither matrix are assigned in order which threshold values are selected according to the segmentation classes signal, and outputs one of a plurality of (for example, 16) output values based on the result of the comparison. In the present embodiment, the multi-level dither processing to output the output image data (output value) of 16 levels (0 to 15) is performed on the input image data (input density value) of 0 to 255. An example of the association among the input density value (pixel density value), the threshold value and the output value is shown in FIG. 8.

As shown in FIG. 8, according to which of a plurality of threshold values $Th[i][j]$ ($j=0, 1, 2, \ldots, 14$; here, $Th[i][j] \leq Th[i][j+1]$) prepared for each position i ($i=0, 1, 2, \ldots, n$) within the dither matrix and the input density value x is higher (the result of the comparison), one of a plurality of output values $Out[j]$ ($j=0, 1, 2, \ldots, 15$; here, $Out[j] \leq Out[j+1]$) is outputted. Here, the threshold values are set so that in part of the dither matrix, a different dither processing is performed according to the result of determination of segmentation class and in the remainder of the dither matrix, a same dither processing is performed irrespective of the result of determination of segmentation class.

Figure 2:
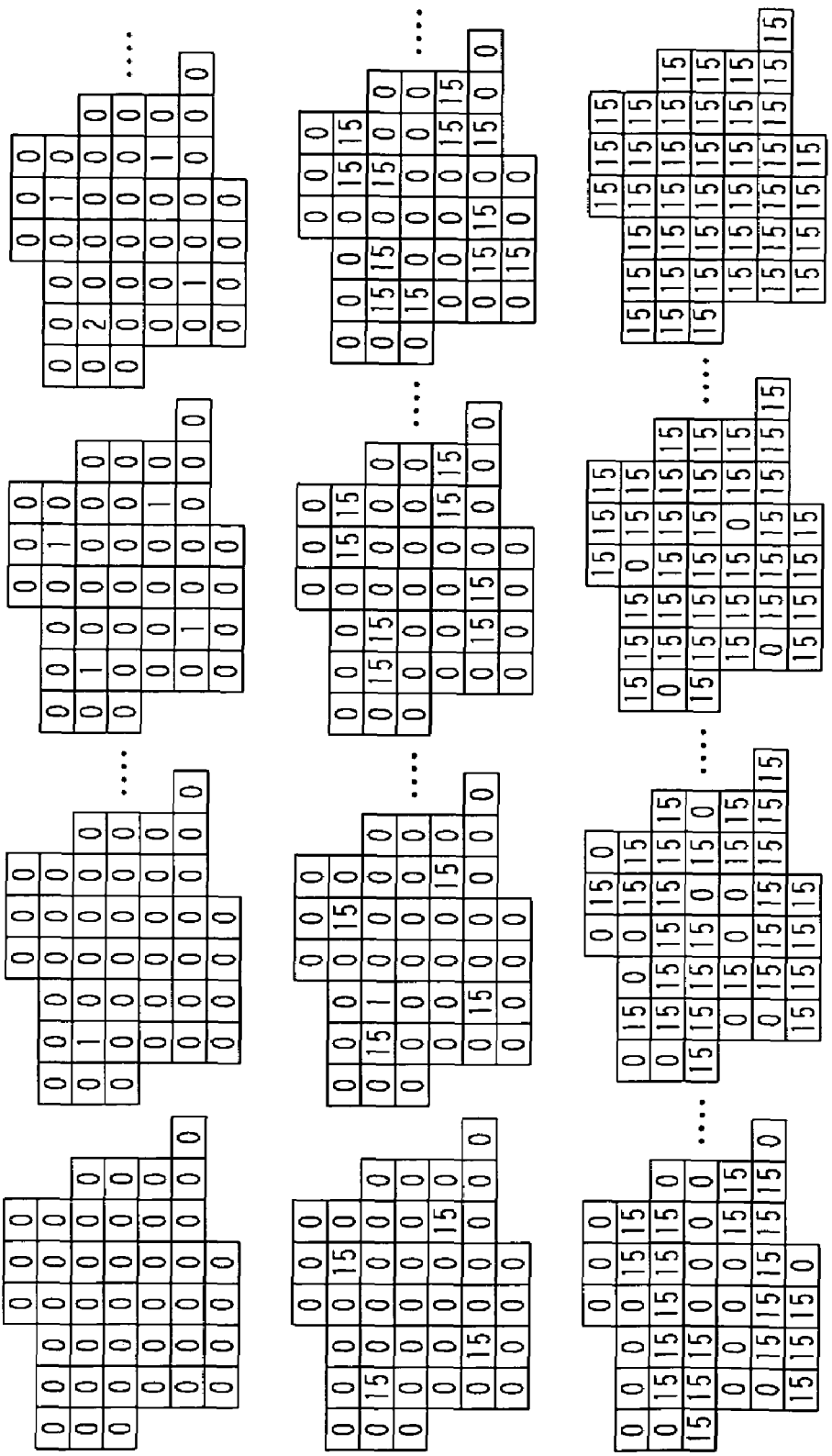
FIG. 2 is a view showing an example of the output values from the low density to the high density when the dither matrix shown in FIG. 1 is used.
Figure 9:
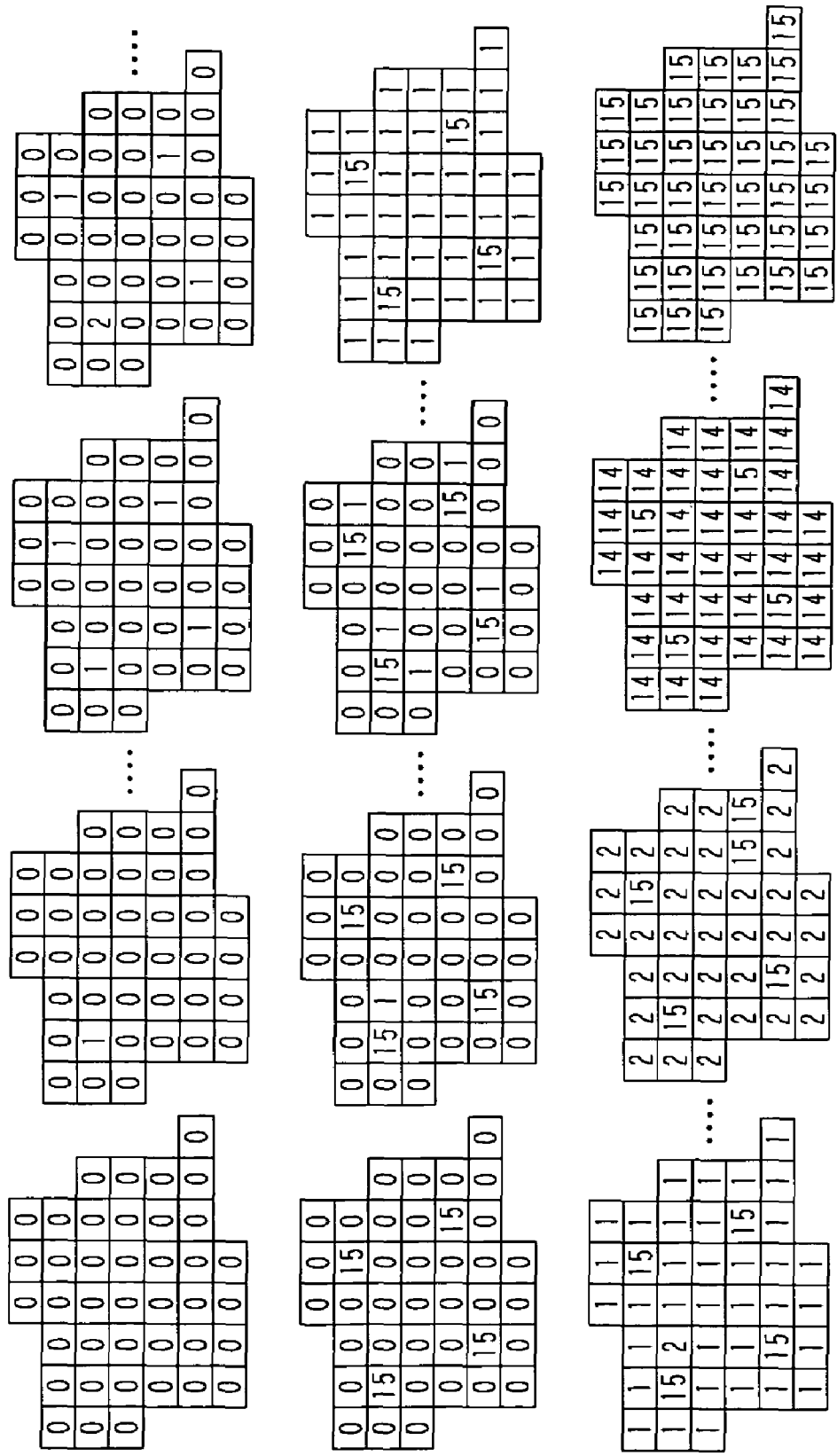
FIG. 9 is a view showing an example of the output values from the low density to the high density when the dither matrix shown in FIG. 1 is used.

FIG. 1 is a view showing an example of the dither matrix used for the multi-level dither processing. FIGS. 2 and 9 are views each showing an example of the output values from the low density to the high density. The dither matrix of FIG. 1 comprises a plurality of (four in the figure) submatrices, and the numerals in the cells (hereinafter, referred to as numbers) represent the order in which higher output values are assigned. The numerals in the cells of FIGS. 2 and 9 represent output values.

The multi-level dither processing for the area other than the edge area is, in the case of the dither matrix as shown in FIG. 1, such that, for example, by the relationship among the threshold values being as follows:

$Th[i][j] \leq Th[i+1][j]$ $Th[4k+3][j] \leq Th[4k][j+1]$ $Th[4k+3][14] \leq Th[4k+4][0]$ (k=0, 1, 2, . . . , 8), as shown in FIG. 2, the output value of each number is increased from 1 to 15 in each submatrix in the order of the numbers from the low density (upper left side of FIG. 2) to the high density (lower right side of FIG. 2). For example, after the output values of the numbers "0," "1," "2" and "3" which are the cores (staring points) of the submatrices are increased from 1 to 15, the output values of the numbers "4," "5," "6" and "7" are increased from 1 to 15, and then, the output value of the number of one position in each submatrix is increased from 1 to 15 in a similar manner.

The multi-level dither processing for the edge area is, in the case of the dither matrix as shown in FIG. 1, such that by the relationship among the threshold values being as follows:

$Th[i][j] \leq Th[i+1][j]$ $Th[3][j] \leq Th[0][j+1]$ $Th[3][14] \leq Th[4][0]$ $Th[39][j] \leq Th[4][j+1]$, as shown in FIG. 9, the output values of the numbers "0," "1," "2" and "3" which are the cores are increased from 1 to 15 in each submatrix from the low density (upper left side of FIG. 9) to the high density (lower right side of FIG. 9), and the output values of the other numbers are uniformly increased in the order of the numbers. For example, after the output values of the numbers "0," "1," "2" and "3" which are the cores (staring points) of the submatrices are increased from 1 to 15, the output values of the numbers "4" to 113911 are increased to 1 in the order of the numbers, and then, the output values of the numbers "4" to "39" are uniformly increased from 2 to 15 in the order of the numbers in a similar manner.

In the present invention, the numbers "0," "1," "2" and "3" which are the cores of the dither matrix for the edge area and the numbers "0," "1," "2" and "3" which are the cores of the dither matrix for the area other than the edge area are in the same positions within the dither matrix, and the output values are increased in a similar manner. Consequently, the screen angle can be prevented from shifting even when different multi-level dither processings are performed in the edge area and in the area other than the edge area.

As shown in FIGS. 2 and 9, on the edge area, a multi-level dither processing where nonuniformity is large compared with that for the area other than the edge area is performed; however, since the edge area does not continue over a wide range, the influence of the nonuniformity is small. In the multi-level dither processing for the edge area, since four pixels of the forty pixels of the dither matrix, that is, one pixel of the ten pixels of each submatrix (the numbers "0," "1," "2" and "3" which are the cores) are converted into the same output values as those in the multi-level dither processing for the area other than the edge area, the switching of the multi-level dither processing is inconspicuous. In addition, since the output values of nine pixels of the ten pixels of each sub matrix are substantially equal with respect to each input density value, an image with excellent reproducibility and with jaggies suppressed can be outputted for the character part and the thin line part.

While in the present embodiment, the output values $Out[j]$ ($j=0, 1, 2, \ldots, 15$; here, $Out[j] \leq Out[j+1]$) are 4-bit integral values from 0 to 15, they may be sixteen integral values selected from among 8-bit integral values from 0 to 255 based on the characteristic of the image output apparatus 34.

Figure 10:
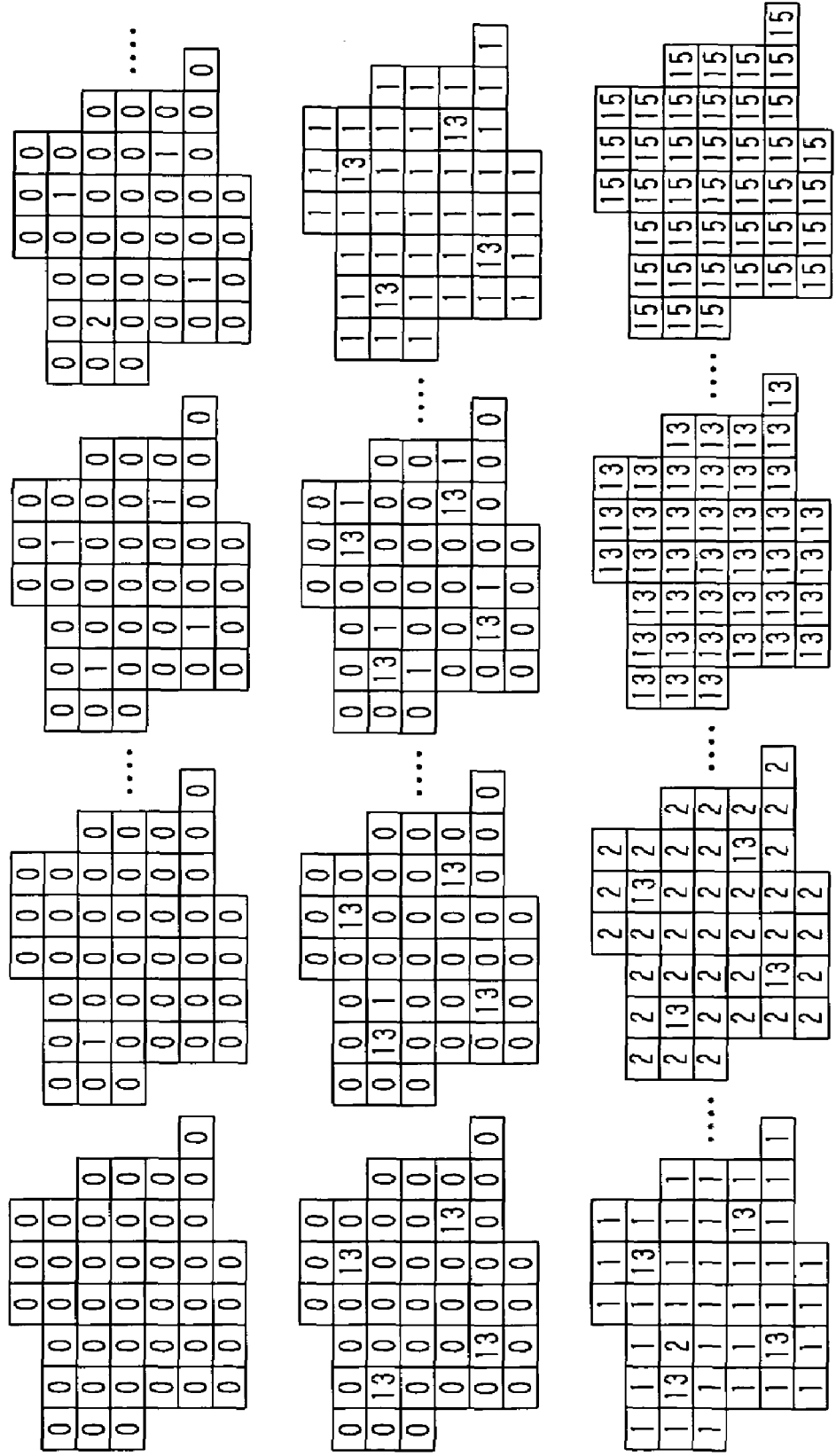
FIG. 10 is a view showing another example of the output values from the low density to the high density.

For the multi-level dither processing for the edge area, a different method may be used. FIG. 10 is a view showing another example of the output values from the low density to the high density. In the case of the dither matrix as shown in FIG. 1, by the relationship among the threshold values being as follows:

$Th[i][j] \leq Th[i+1][j]$ $Th[3][j1] \leq Th[0][j1+1]$ $Th[3][12] \leq Th[4][0]$ $Th[39][j1] \leq Th[4][j1+1]$ $Th[39][j2] \leq Th[0][j2+1]$ (j1=0, 1, 2, ..., 11, or j2=12, 13), as shown in FIG. 10, the output values of the numbers "0," "1," "2" and "3" which are the cores are increased from 1 to 13 from the low density (upper left side of FIG. 10) to the high density (lower right side of FIG. 10) for each submatrix, and the output values of the other numbers are uniformly increased to 13 in the order of the numbers and then, overall uniformly increased to 15. For example, after the output values of the numbers "0," "1," "2" and "3" which are the cores (staring points) of the submatrices are increased from 1 to 13, the output values of the numbers "4" to "39" are increased to 1 in the order of the numbers, and then, in a similar manner, the output values of the numbers "4" to "39" are uniformly increased from 2 to 13 in the order of the numbers and the output values of the numbers "0" to "39" are uniformly increased to 15 in the order of the numbers. In this case, compared with the above-described multi-level dither processing for the edge area (the output values are increased from 1 to 15), jaggies are inconspicuous although the non-uniformity of the high density (not less than 13) is large.

The output tone correction section 18 performs the output tone correction processing to convert the density signal or the like into the halftone area ratio which is the characteristic value of the image output apparatus 34. Since the input-output relationship (the relationship between before and after the conversion) of the output tone correction is determined based on the characteristic of the image output apparatus 34 and the processing performed by the tone reproduction process section 19, normally, when the multi-level dither processing performed by the tone reproduction process section 19 is different, it is necessary to change the input-output relationship of the output tone correction according to the multi-level dither processing. For example, when the output tone correction is performed by use of a correction table (tone correction information), a plurality of correction tables are necessary. However, as the input-output relationship of the output tone correction, only the input-output relationship corresponding to the multi-level dither processing for the area other than the edge area is used, and this input-output relationship can be used for both the edge area and the area other than the edge area. When the relationship is used for both of the areas, since the memory capacity required for storing the correction table is smaller and the switching of the correction table is not performed, the processing speed is higher and the part of switching of the correction table is more inconspicuous.

Figure 11:
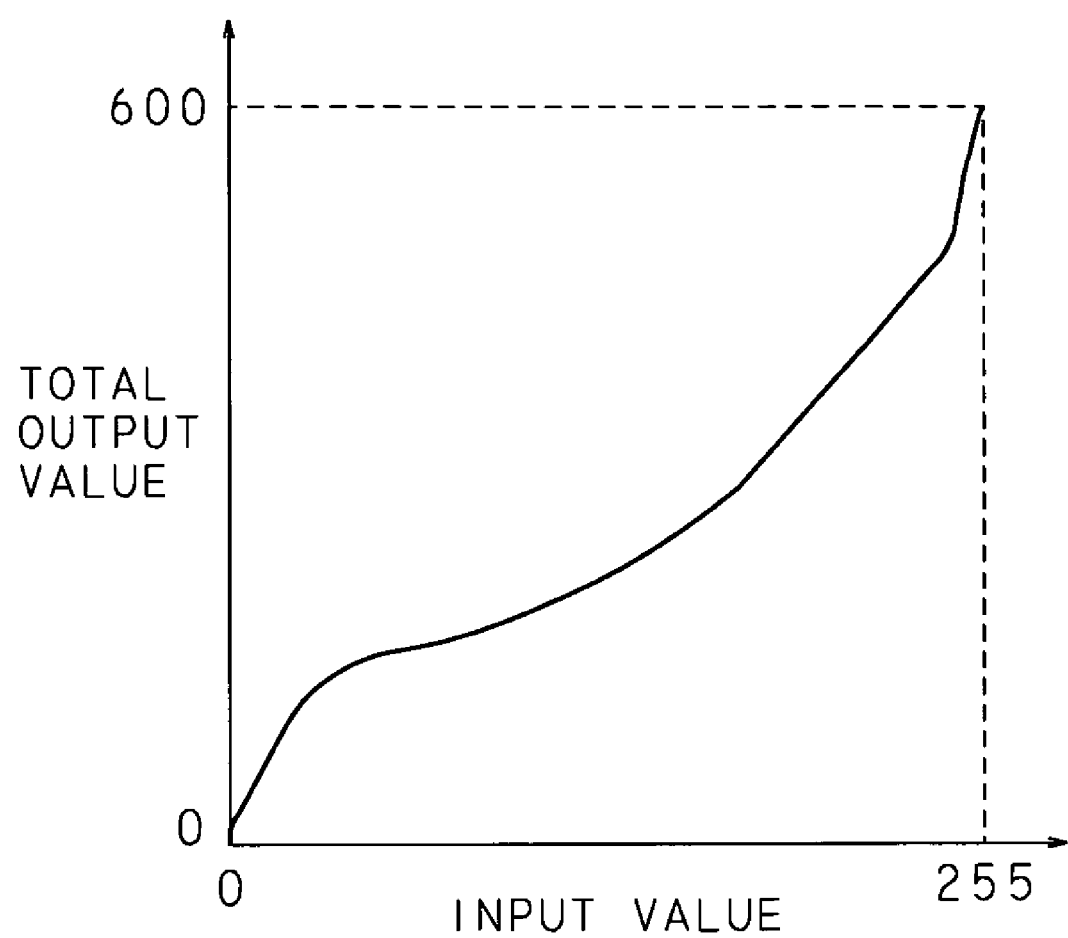
FIG. 11 is a view showing an example of the relationship between the input value and the total output value in the dither matrix.

The output tone correction processing of the output tone correction section 18 can be simultaneously performed at the time of the multi-level dither processing of the tone reproduction process section 19 by setting the relationship between the input value (input density value) and the total output value in the dither matrix according to the output characteristic of the image output apparatus 34. FIG. 11 is a view showing an example of the relationship between the input value and the total output value in the dither matrix of the area other than the edge area. In FIG. 11, the input value is 0 to 255, and the total output value in the dither matrix is 0 to 600 (the output value 15 per pixel×40 pixels=600). Based on the relationship between the input value and the total output value, pairs of fifteen threshold values and sixteen output values corresponding to the area are set. As the relationship between the input value and the total output value for the multi-level dither processing for the edge area, the relationship between the input value and the total output value for the multi-level dither processing for the area other than the edge area may be used as it is.

Figure 12:
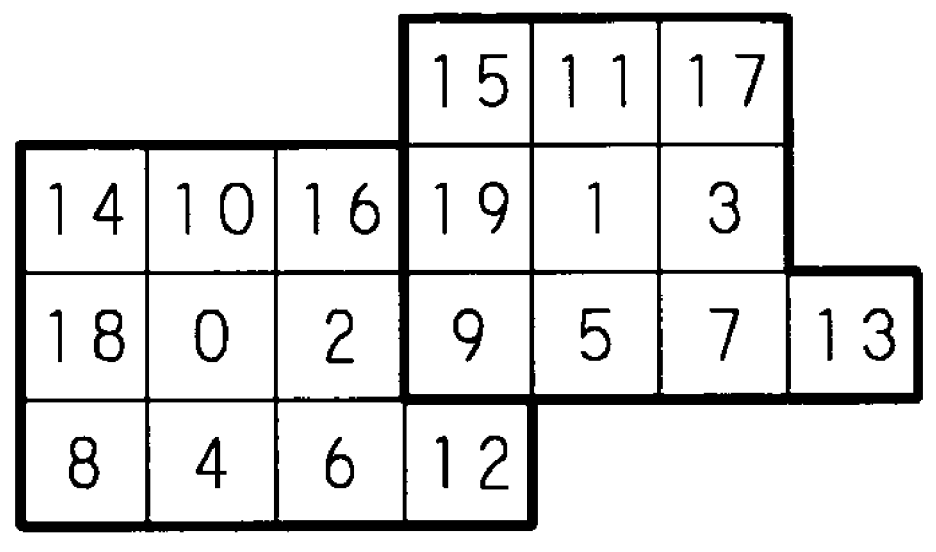
Figure 13:
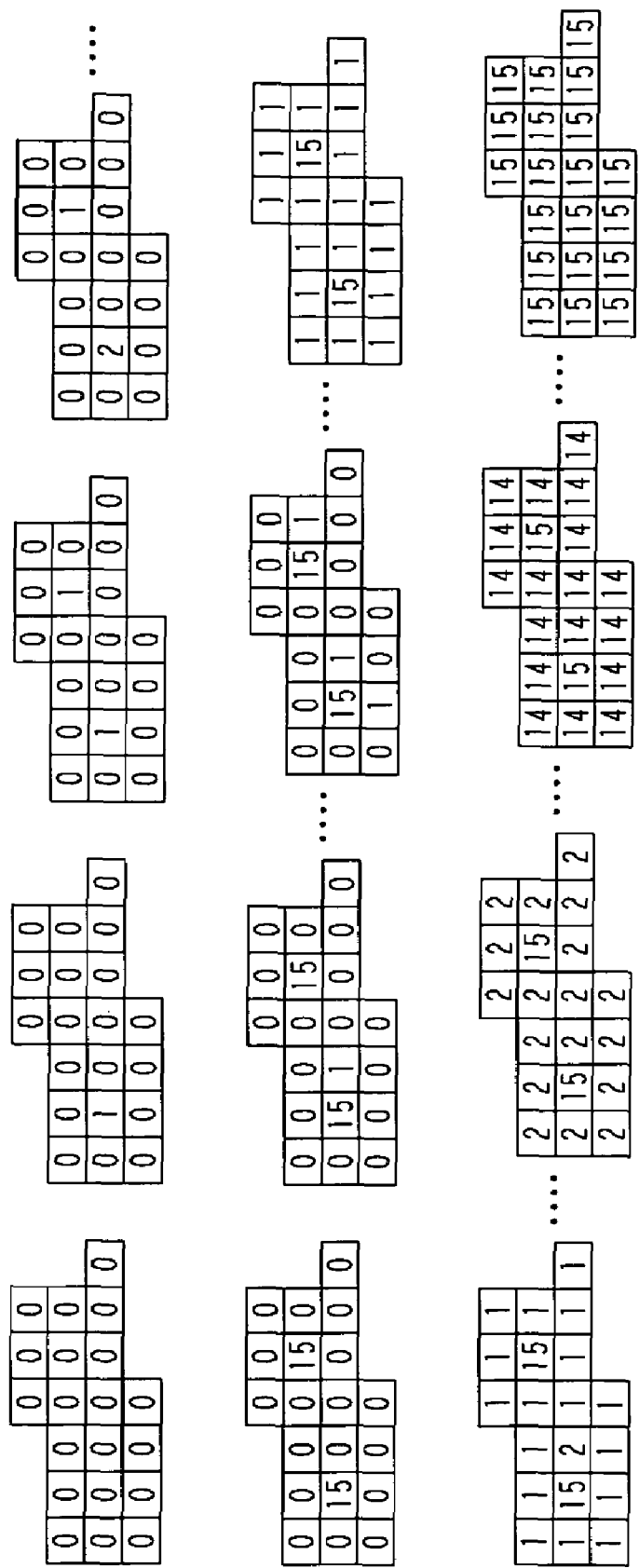
FIG. 13 is a view showing an example of the output values from the low density to the high density when the dither matrix shown in FIG. 12 is used.

While in the present embodiment, the dither matrix comprising a plurality of submatrices as shown in FIG. 1 is described as an example, the number of submatrices is arbitrary, and one submatrix may be used as the dither matrix. FIG. 12 is a view showing another example of the dither matrix used for the multi-level dither processing. FIG. 13 is a view showing an example of the output value from the low density to the high density. The dither matrix of FIG. 12 comprises a plurality of (two in the figure) submatrices. The numerals (numbers) in the cells represent the order in which higher output values are assigned, and the numerals in the cells of FIG. 13 represent the output values.

Switching between the dither matrix comprising four submatrices shown in FIG. 1 and the dither matrix comprising two submatrices shown in FIG. 12 may be made according to the area. A dither matrix comprising a smaller number of submatrices is more advantageous in size and cost reduction because it requires a smaller memory capacity.

Second Embodiment

Figure 14:
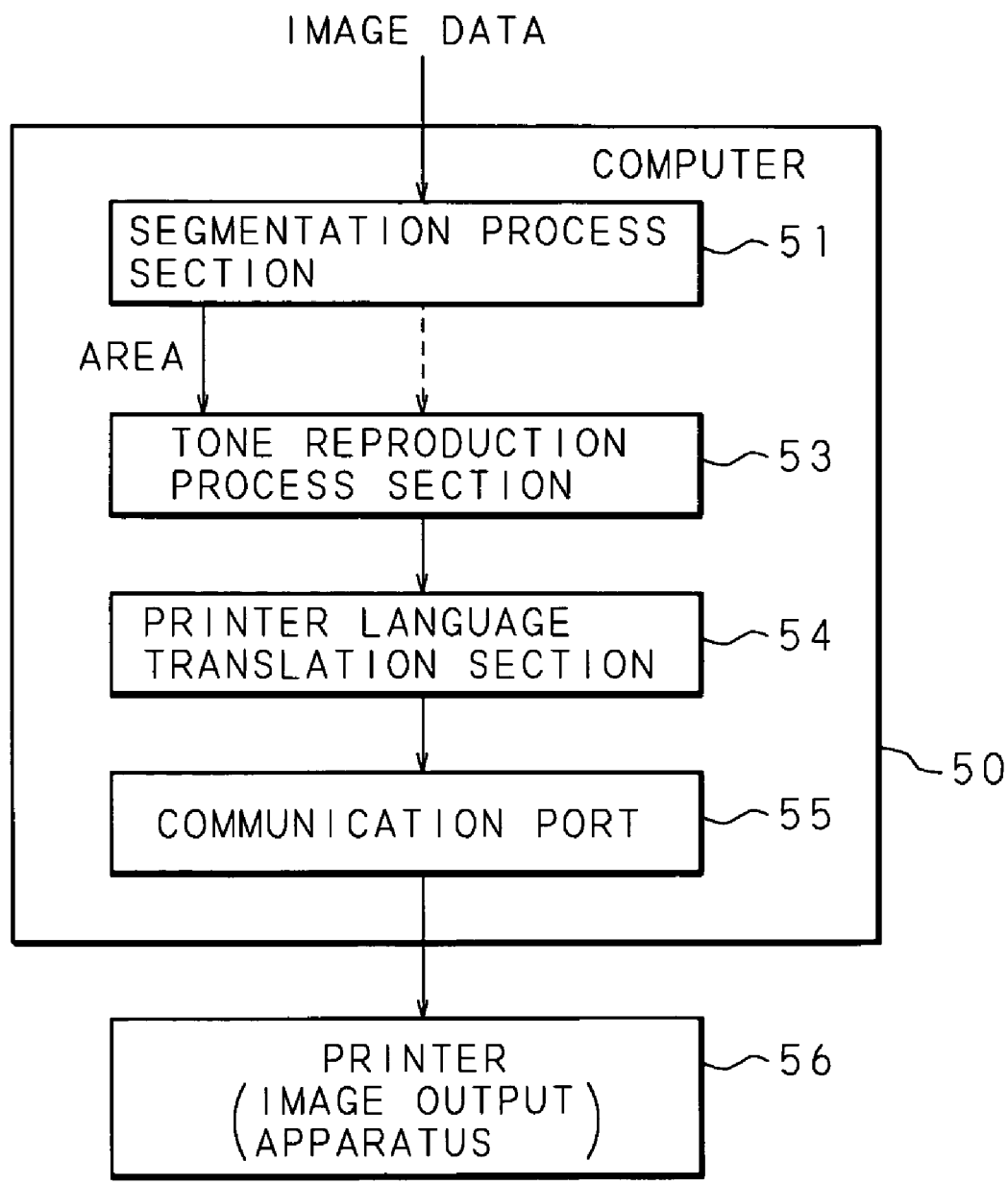
FIG. 14 is a block diagram showing an example of the structure of an image forming system including the image processing apparatus according to the present invention.

FIG. 14 is a block diagram showing an example of the structure of an image forming system including the image processing apparatus according to the present invention. This image forming system has a computer (image processing apparatus) 50 and a printer (image output apparatus, image forming apparatus) 56. The printer 56 is capable of color output, and may be a digital multifunction apparatus having the copy function and the facsimile function as well as the printer function. The printer 56 performs image formation according to the electrophotographic method or the inkjet method.

For example, image data is inputted from an image scanner such as a flatbed scanner or a film scanner, or a digital camera to the computer 50, and is stored onto a non-illustrated storage device such as a hard disk. The image data inputted to the computer 50 can be processed and edited by executing various application programs. The computer 50 operates as a segmentation process section 51 that determines the areas to which the pixels of the output image data outputted to the printer 56 belong; a tone reproduction process section 53 that performs the halftone generation processing; and a printer language translation section 54 that converts the output image data into the printer language. The segmentation process section 51 performs a segmentation processing (area determination processing) similar to that performed by the segmentation process section 14 of the image processing apparatus 10 of the above-described first embodiment. The tone reproduction process section 53 performs a similar halftone generation processing (dither processing) to that performed by the tone reproduction process section 19 of the image processing apparatus 10 of the first embodiment. Although not shown, the computer 50 can perform processings similar to those performed by the color correction section 15, the black generation and under color removal section 16, the spatial filter process section 17 and the output tone correction section 18 of the image processing apparatus 10 of the first embodiment. The data converted into the printer language by the printer language translation section 54 is outputted to the printer 56 through a communication port 55 (a Centronics port, a LAN (local area network) port, etc.).

Figure 15:
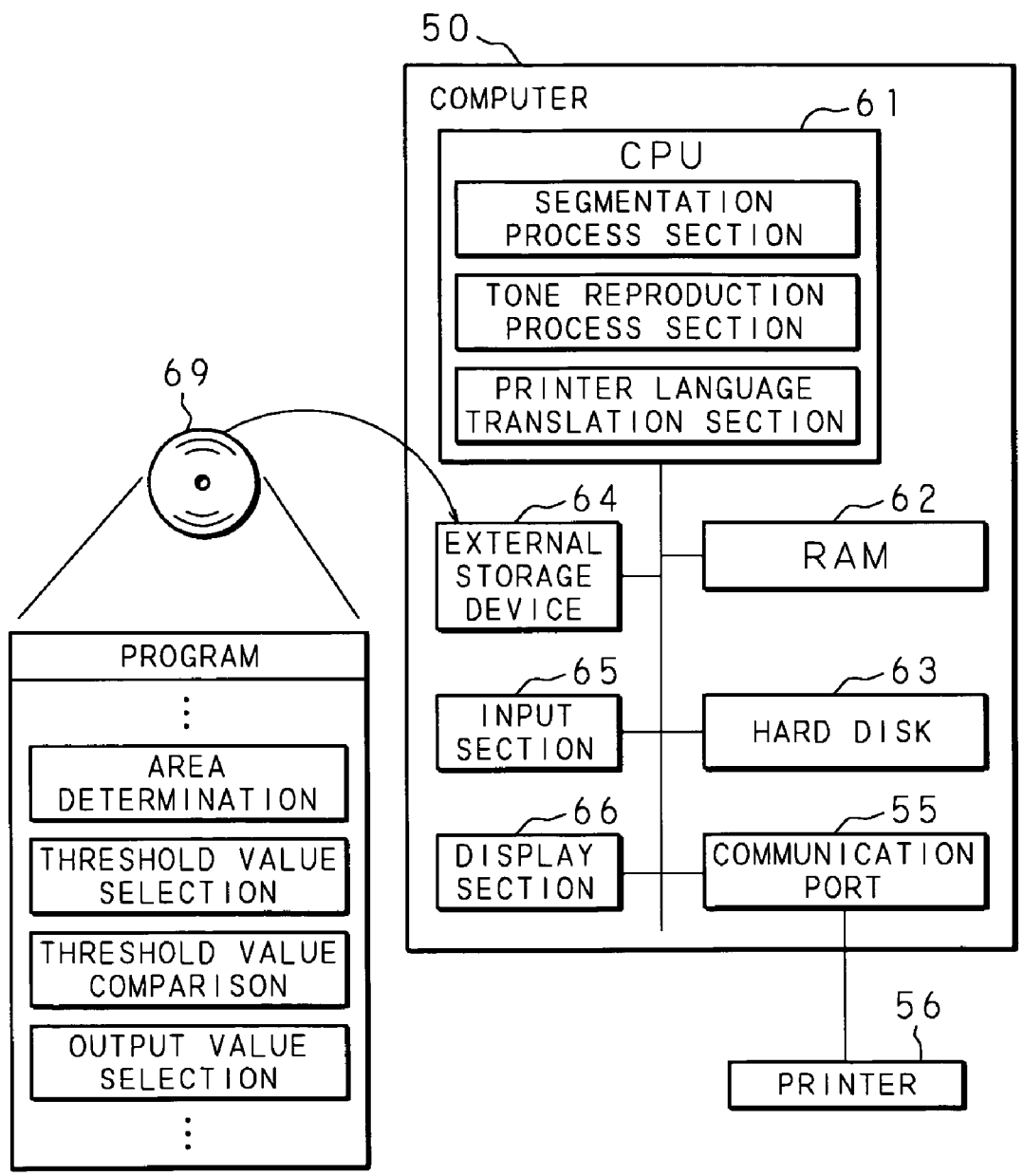
FIG. 15 is a block diagram showing an example of the structure of the computer.

FIG. 15 is a block diagram showing an example of the structure of the computer. The computer 50 has a CPU 61, a RAM (random access memory) 62, a hard disk drive (hereinafter, abbreviated as hard disk) 63, an external storage device 64 such as a flexible disk drive or a CD-ROM (compact disk-read only memory) and the communication port 55 that controls the communication with the printer 56 and the like. Moreover, the computer 50 has an input section 65 such as a keyboard and a mouse and a display section 66 such as a CRT (cathode ray tube) display or a liquid crystal display. The communication port 55 includes a network card or a modem, and capable of connection with communication networks such as LANs, the Internet and the telephone line.

The CPU 61 controls the above-mentioned components 62 to 66 and 55. Moreover, the CPU 61 stores the program or data accepted from the input section 65 or the communication port 55, or the program or data read from the hard disk 63 or the external storage device 64 into the RAM 62, executes the program stored in the RAM 62 or performs processings such as data operation, and stores the results of the processings or temporary data used for the processings into the RAM 62. The data such as the results of the processings stored in the RAM 62 is stored in the hard disk 63 or outputted from the display section 66 or the communication port 55 by the CPU 61.

The CPU 61 operates as the segmentation process section 51, the tone reproduction process section 53 and the printer language translation section 54. The image data is inputted from, for example, a scanner or a digital camera to the computer 50, and stored onto the hard disk 63. Moreover, the CPU 61 operates as the threshold process section 42 and the threshold selection section (selector) 44 of the first embodiment (FIG. 7). The RAM 62 or the hard disk 63 operates as the threshold output storage section (memory) 46.

By reading the computer program recorded on a recording medium 69 such as a CD-ROM by the external storage device 64, storing it into the hard disk 63 or the RAM 62 and executing it by the CPU 61, the computer 50 can be caused to operate as the above-mentioned components. Moreover, it may be performed to accept a computer program from another apparatus through the communication port 55 connected to a LAN or the like and store it in the hard disk 63 or the RAM 62. The computer program realizing the tone reproduction processing (dither processing) according to the present invention may be included in the printer driver or may be included in application software for image processing.

Figure 16:
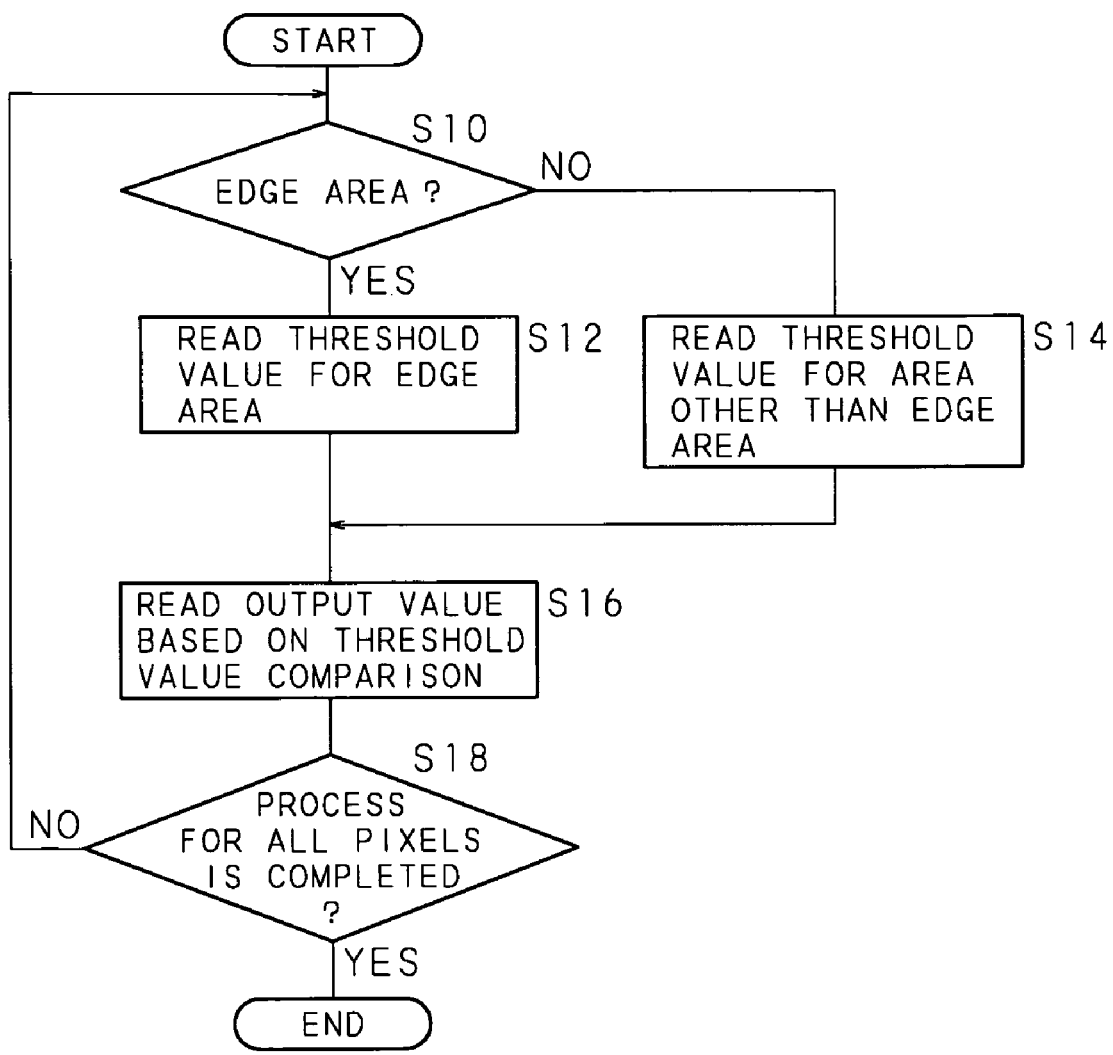
FIG. 16 is a flowchart showing an example of the dither processing procedure.

FIG. 16 is a flowchart showing an example of the dither processing procedure. The CPU 61 determines the area to which the pixel to be processed belongs, and stores the result of the determination into the RAM 62. When the result of the determination is the edge area (S10: YES), the CPU 61 reads a pair of threshold values for the edge area from the hard disk 63 (S12), and stores them into the RAM 62. When the result of the determination is the area other than the edge area (S10: NO), the CPU 61 reads a pair of threshold values for the area other than the edge area from the hard disk 63 (S14), and stores them into the RAM 62. The CPU 61 compares the read threshold values with the value of the pixel to be processed, reads the output value based on the result of the threshold value comparison (which is higher) from the hard disk 63 (S16), and stores it into the RAM 62. The above-described processing is performed on all the pixels (S18: NO). The area determination, the threshold value selection, and the output value selection are performed similarly to the first embodiment.

Third Embodiment

Figure 17:
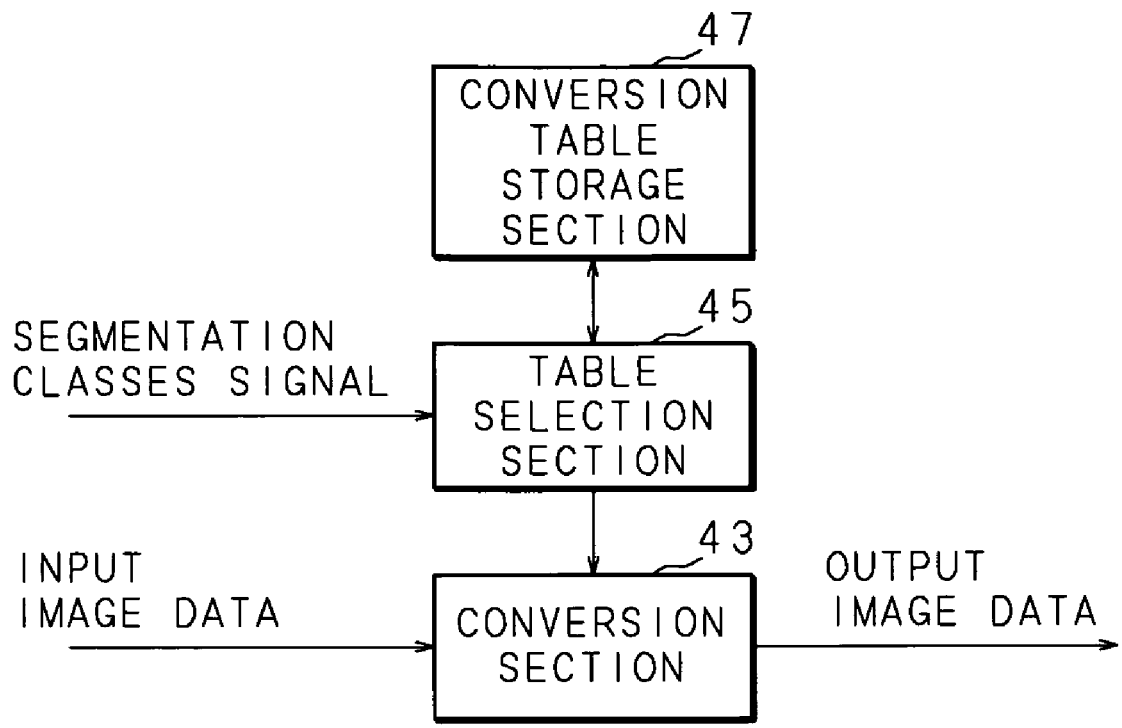
FIG. 17 is a block diagram showing another example of the structure of the relevant part of the tone reproduction process section.

While threshold values are used to perform the multi-value dither processing in the above-described embodiments, the multi-level dither processing may be performed by using a conversion table (association data). FIG. 17 is a block diagram showing another example of the structure of the relevant part of the tone reproduction process section 19. The tone reproduction process section 19 has a conversion section 43, a table selection section 45 and a conversion table storage section 47. The conversion table storage section 47 stores the association (conversion tables) between the input value (input pixel value) and the output value of the dither processing using the threshold values of the first embodiment. The conversion tables are stored being classified according to the result of the area determination such as the edge area (for example, the character area) and the areas other than the edge area (for example, the halftone area, the photographic paper area, and the page background area).

The segmentation classes signal is inputted to the table selection section 45, and based on the segmentation classes signal, the table selection section 45 selects the conversion table for the edge area or the conversion table for the area other than the edge area, reads it from the conversion table storage section 47, and transmits it to the conversion section 43. While in the present embodiment, the conversion table for the area other than the edge area is used for the pixels belonging to the halftone area, a conversion table for the halftone area may be prepared so that it is selected and used in the case of the halftone area. For input image data (input value), the conversion section 43 outputs the corresponding output image data (output value) based on the conversion table selected according to the segmentation class signal. In this case, since the comparison with the threshold value is not performed, the dither processing can be performed at high speed. However, the storage capacity for the conversion tables is necessary.

Fourth Embodiment

Figure 18:
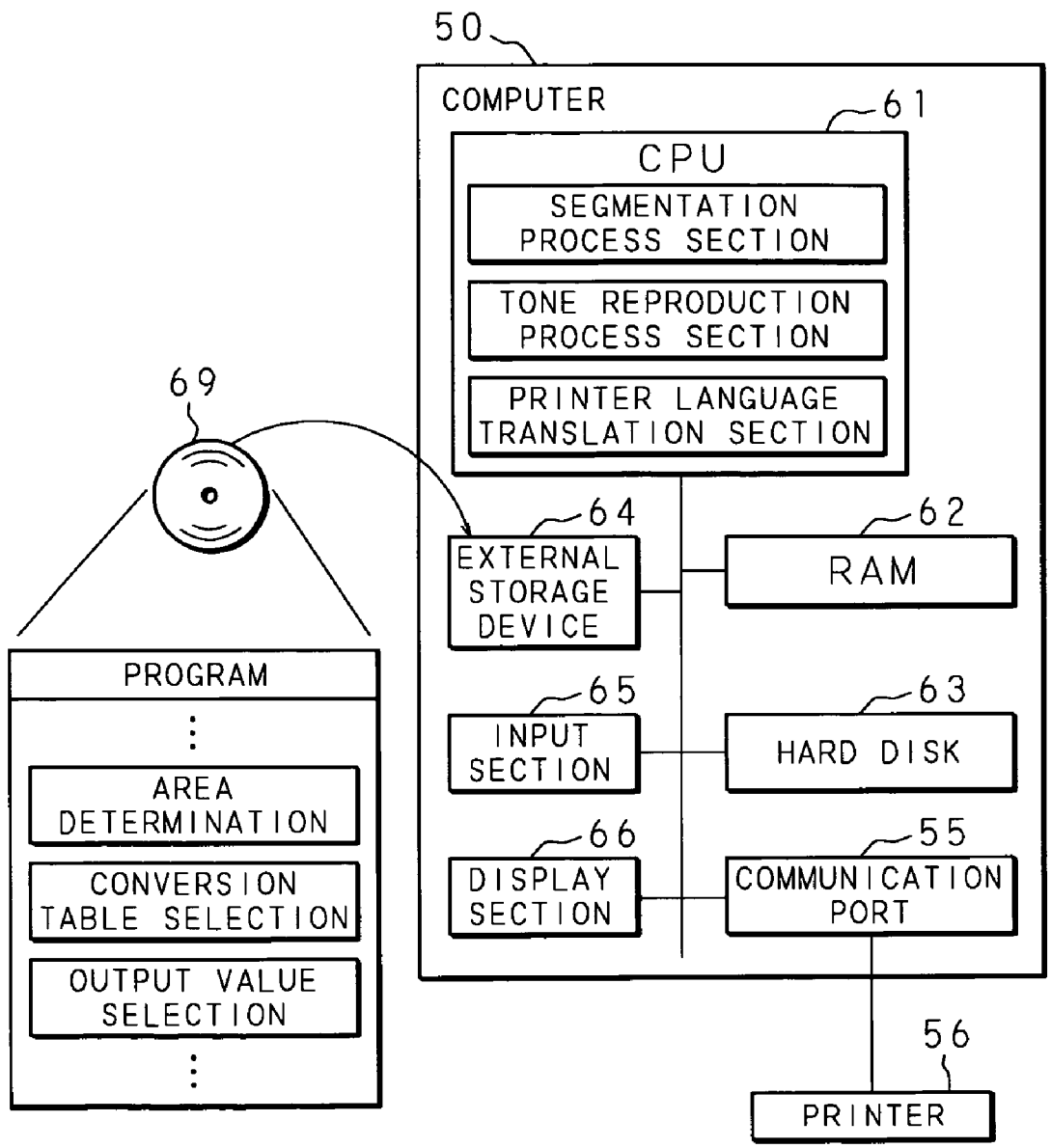
FIG. 18 is a block diagram showing an example of the structure of the computer.

Like the above-described second embodiment, the computer can be caused to operate as the tone reproduction process section 19 of the third embodiment. FIG. 18 is a block diagram showing an example of the structure of the computer. While the structure of the computer 50 is similar to that of the second embodiment (FIG. 15), the computer program recorded on the recording medium 69 is different, and by reading the computer program by the external storage device 64 and executing it, the computer can be caused to operate as the tone reproduction process section 19 of the third embodiment. In the present embodiment, the CPU 61 operates as the conversion section 43 and the table selection section (selector) 45 of the third embodiment (FIG. 17). The RAM 62 or the hard disk 63 operates as the conversion table storage section (memory) 47.

Figure 19:
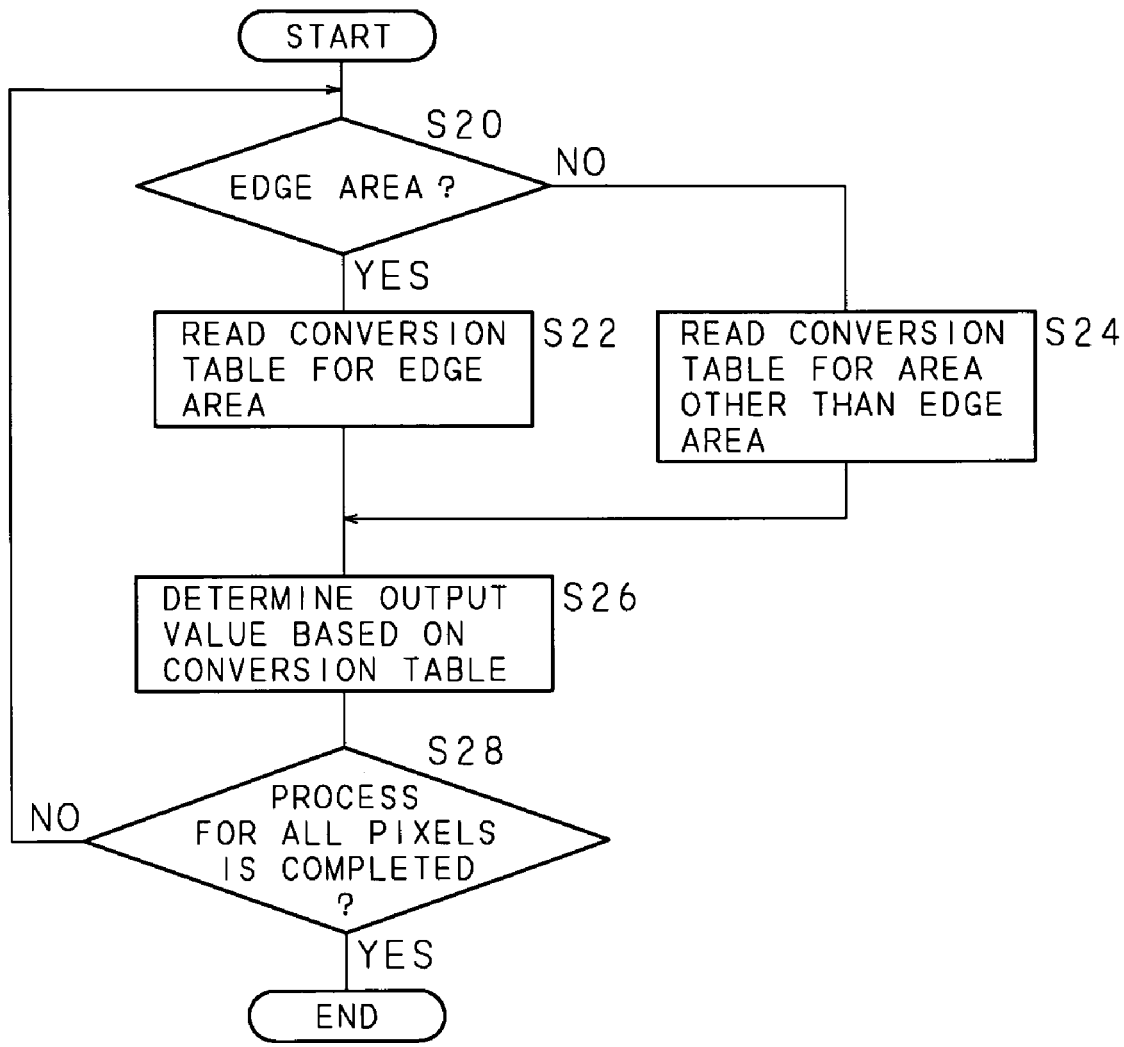
FIG. 19 is a flowchart showing another example of the dither processing procedure.

FIG. 19 is a flowchart showing another example of the dither processing procedure. The CPU 61 determines the area to which the pixel to be processed belongs, and stores the result of the determination into the RAM 62. When the result of the determination is the edge area (S20: YES), the CPU 61 reads the conversion table (association data) for the edge area (S22), and stores it into the RAM 62. When the result of the determination is the area other than the edge area (S20: NO), the CPU 61 reads the conversion table (association data) for the area other than the edge area from the hard disk 63 (S24), and stores it into the RAM 62. The CPU 61 determines the output value corresponding to the value of the pixel to be processed based on the read conversion table (S26), and stores it into the RAM 62. The above-described processing is performed on all the pixels (S28: NO). The area determination, the conversion table selection, and the output value selection are performed similarly to the third embodiment.

While the computer program that causes the computer to perform the tone reproduction processing (dither processing) according to the present invention is stored in the storage medium as described in the second and fourth embodiments, the storage medium may be a non-illustrated memory, for example, a program medium such as a ROM so that the processing is performed by a microcomputer, or may be a program medium that is readable by providing a program reader such as the external storage device 64 and inserting a recording medium thereinto. In any case, a structure may be adopted such that the stored program is executed by the microprocessor accessing it, or a method may be adopted such that a program is read, the read program is downloaded into a non-illustrated program storage area of the microcomputer and the program is executed. In this case, the program to be downloaded is prestored in the apparatus.

The program medium is a recording medium structured so as to be separable from the body, and may be a medium, fixedly carrying programs, including: tapes such as magnetic tape and cassette tape; magnetic disks such as flexible disks and hard disks; disks such as optical disks, for example, CD-ROMs, MO (magneto optical) disks, MDs (mini disks), DVDs (digital versatile disks); cards such as IC (integrated circuit) cards (including memory cards) and optical cards; and semiconductor memories such as mask ROMs, EPROMs (erasable programmable ROMs), EEPROM (electrically erasable programmable ROMs) and flash ROMs.

In the case of a system structure connectable to communication networks including the Internet, the program medium may be a medium fluidly carrying programs such as downloading programs from the communication networks. When programs are downloaded through communication networks like this, programs to be downloaded may be prestored in the apparatus or may be installed from another recording medium.

Fifth Embodiment

While in the above-described first embodiment, in the case of the edge area, the output values of the numbers which are the cores are increased from 1 to 15 for each submatrix as shown in FIG. 9 and in the case of the area other than the edge area, the output values are uniformly increased in the order of the numbers, in the multi-level dither processing for the edge area, instead of increasing the output values of the numbers which are the cores (starting points) of all the submatrices to a predetermined value first, only the output value of the number which is the core (starting point) of a predetermined submatrix may be increased to a predetermined value first.

Figure 20:
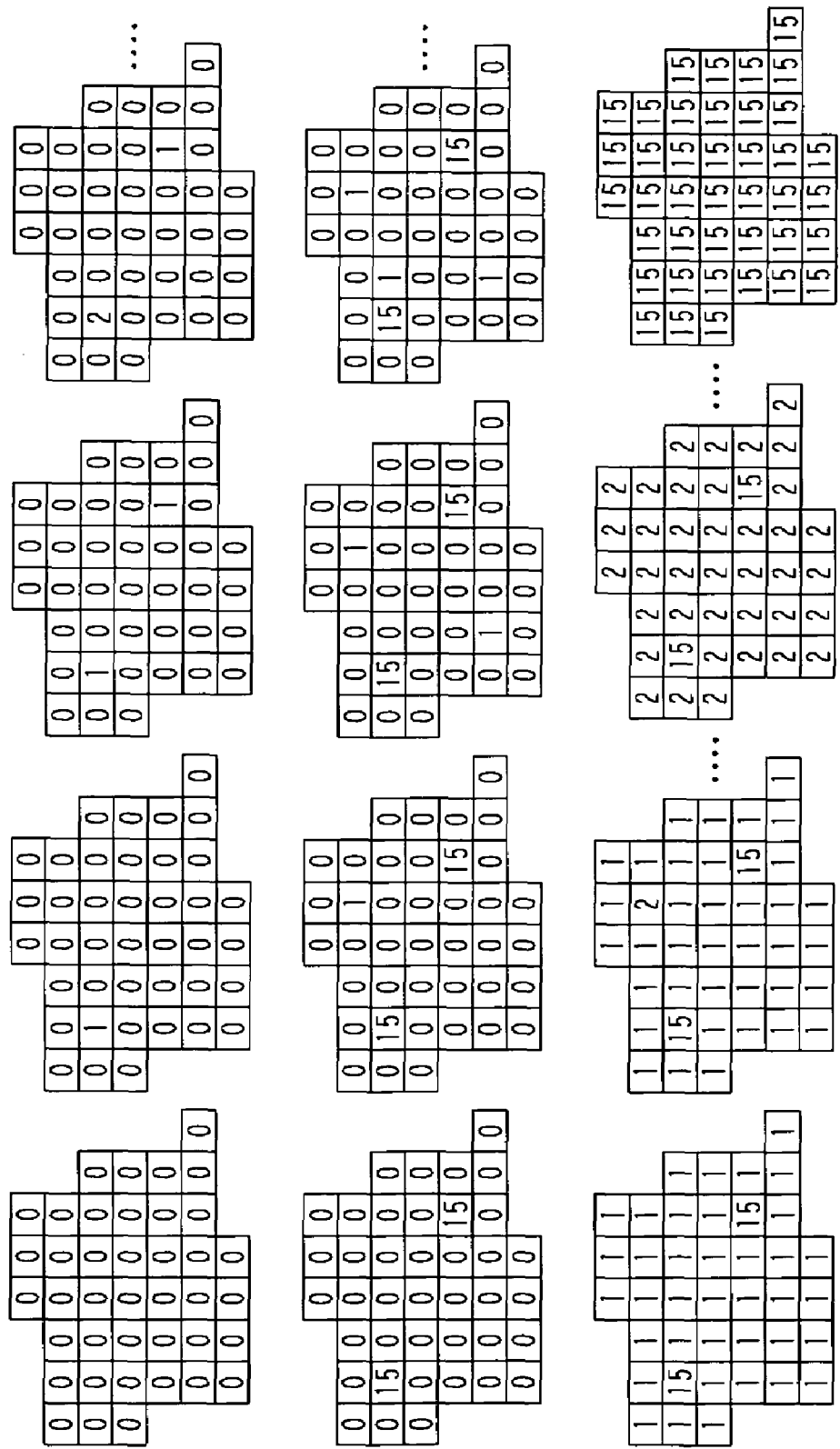
FIG. 20 is a view showing another example of the output values from the low density to the high density.

FIG. 20 is a view showing another example of the output values from the low density to the high density. In the dither matrix as shown in FIG. 1, by the relationship among the threshold values of the multi-level dither processing for the edge area being as follows:

$Th[i][j] \leq Th[i+1][j]$ $Th[1][j] \leq Th[0][j+1]$ $Th[1][14] \leq Th[2][0]$ $Th[39][j] \leq Th[2][j+1]$, as shown in FIG. 20, the output values of the numbers "0" and "1" which are the cores of two of the four submatrices are increased from 1 to 15 from the low density (upper left side of FIG. 20) to the high density (lower right side of FIG. 20), and the output values of the other numbers are uniformly increased in the order of the numbers. For example, after the output values of the numbers "0" and "1" which are the cores (staring points) of the two submatrices are increased from 1 to 15, the output values of the numbers "2" to "39" are increased to 1 in the order of the numbers, and then, the output values of the numbers "2" to "39" are uniformly increased from 2 to 15 in the order of the numbers in a similar manner. Consequently, since the output values of 38 pixels of the 40 pixels of the four submatrices each including ten pixels are substantially equal with respect to the input density values, an image with excellent reproducibility and with jaggies suppressed can be outputted for the character part and the thin line part.

Figure 21:
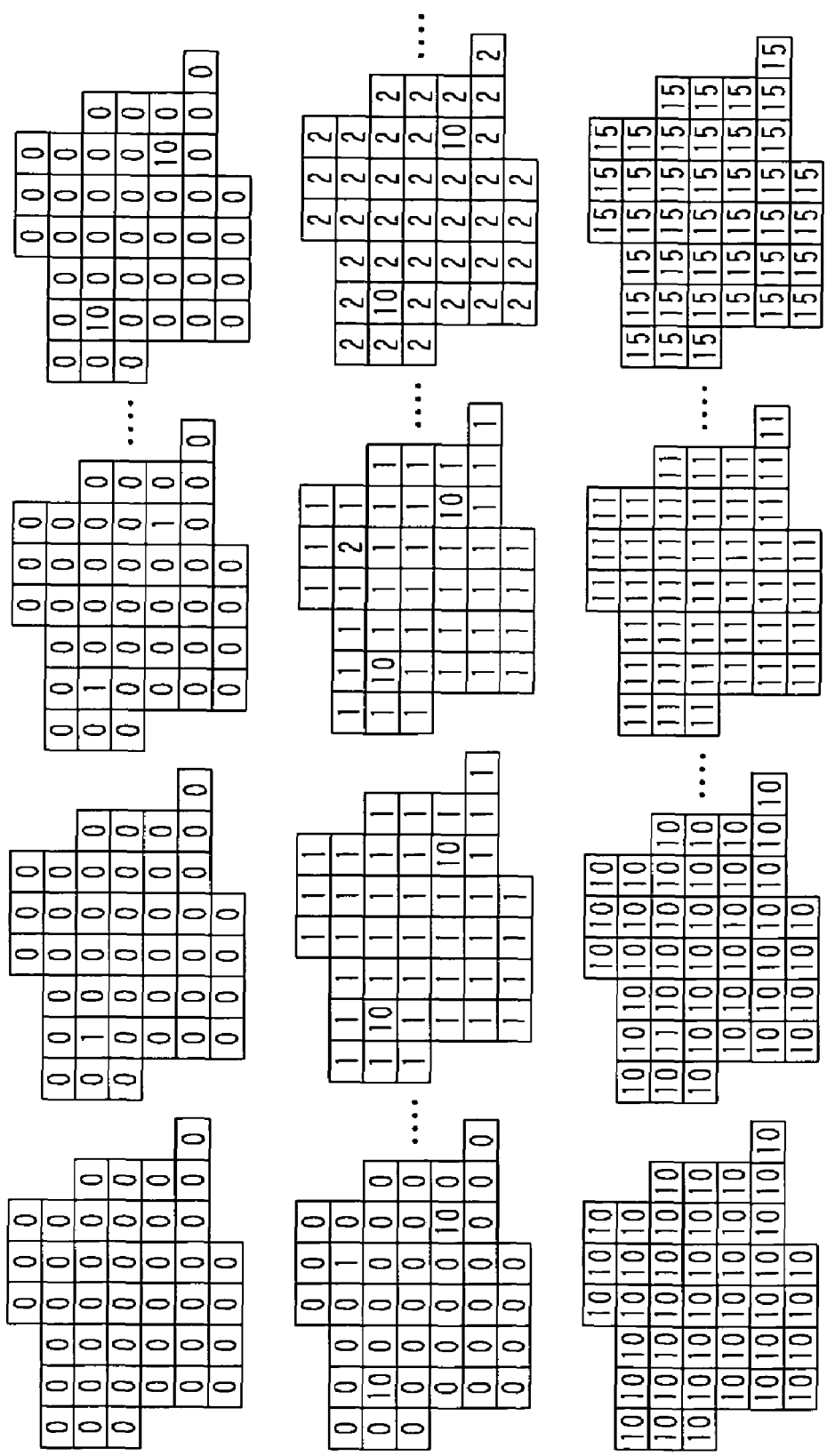
FIG. 21 is a view showing another example of the output values from the low density to the high density.

For the multi-level dither processing for the edge area, a different method may be used. FIG. 21 is a view showing another example of the output values from the low density to the high density. In the dither matrix as shown in FIG. 1, by the relationship among the threshold values as follows:

$Th[i][j] \leq Th[i+1][j]$ $Th[1][j1] \leq Th[0][j1+1]$ $Th[1][9] \leq Th[2][0]$ $Th[39][j1] \leq Th[2][j1+1]$ $Th[39][j2] \leq Th[0][j2+1]$ (j1=0, 1, 2, . . . , 8, or j2=9, . . . , 13), as shown in FIG. 21, the output values of the numbers "0" and "1" which are the cores of two of the four submatrices are increased from 1 to 10 from the low density (upper left side of FIG. 21) to the high density (lower right side of FIG. 21), and the output values of the other numbers are uniformly increased to 10 in the order of the numbers and then, overall uniformly increased to 15. For example, after the output values of the numbers "0" and "1" which are the cores (staring points) of the two submatrices are increased from 1 to 10, the output values of the numbers "2" to "39" are increased to 1 in the order of the numbers, and then, in a similar manner, the output values of the numbers "2" to "39" are uniformly increased from 2 to 10 in the order of the numbers and the output values of the numbers "0" to "39" are uniformly increased from 11 to 15 in the order of the numbers. In this case, compared with the above-described multi-level dither processing for the edge area (the output values of "0" and "1" are increased from 1 to 15 first), jaggies are inconspicuous although the nonuniformity of the high density (not less than 10) is large.

Figure 22:
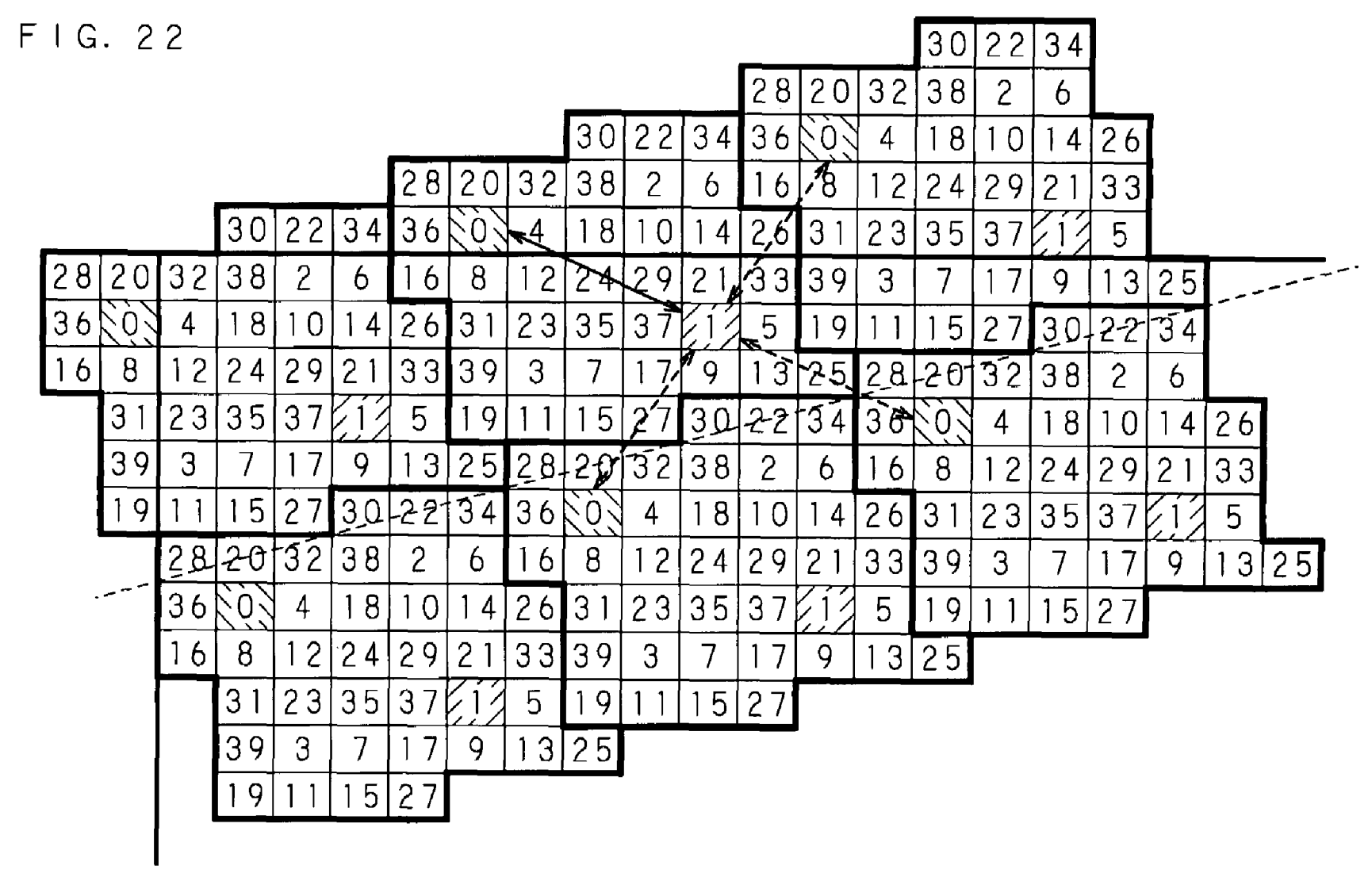
Figure 23:
FIG. 23 is a view showing another example of the selection of a submatrix where the output value of the number which is the core is increased first, from among a plurality of submatrices.
Figure 24:
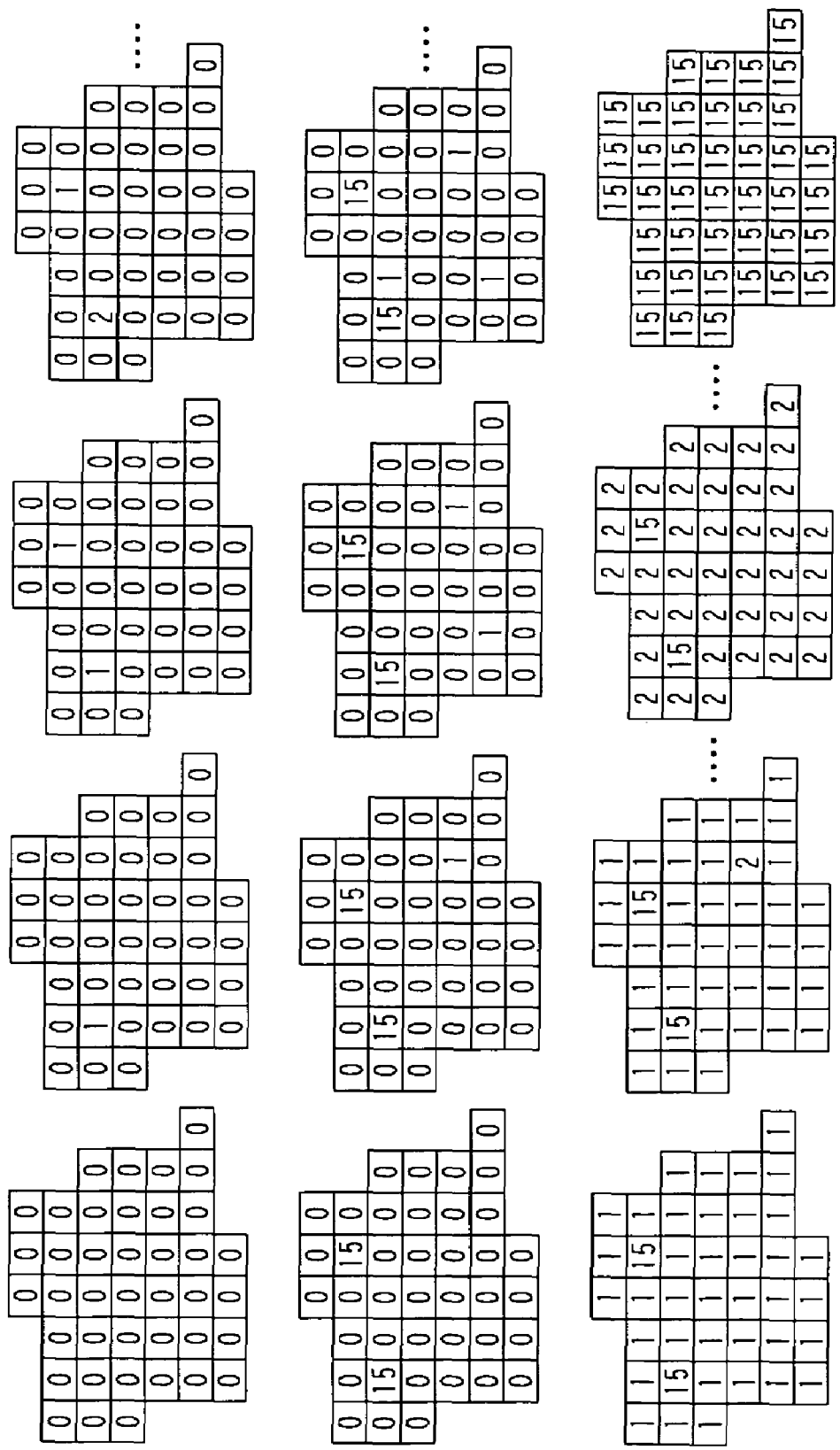
FIG. 24 is a view showing another example of the output values from the low density to the high density.

It is desirable that of a plurality of submatrices, the submatrix where the output value of the number which is the core is increased first be selected so that the distances (the arrows in the figure) from the pixel of the number "1" which is the core of the submatrix to the pixels of the numbers "0" which are the cores of the surrounding submatrices are the same as shown in FIG. 22. As the selection of the submatrix where the output value of the number which is the core is increased first, although the arrangement where the distances are not the same as shown in FIG. 23 is possible (see FIG. 24 for the method of increasing the output values), when the distances are the same as shown in FIG. 22, the position nonuniformity of the tone characteristic of the edge area can be suppressed while the image quality degradation due to the switching of a plurality of pairs threshold values is suppressed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computer image processing method, the method comprising:
providing a computer having an image input apparatus, a storage section, a segmentation process section and an image output apparatus;
providing to the storage section an image comprising a plurality of pixels;
segmenting the pixels into one or more segmentation classes to which each pixel to be processed belongs;
performing a dither process using a dither matrix of a same configuration and a same size with a plurality of pairs of threshold values based on the segmentation class to which each pixel belongs,
wherein according to the result of determination of the segmentation class a first dither processing is performed on one part of the dither matrix and a second dither processing is performed on another part of the dither matrix, the first dither processing being different from the second dither processing, and
to perform the dither processing, any of a plurality of pairs of threshold values is selected according to the result of determination of the segmentation class, and the selected pair of threshold values are compared with a value of the pixel to be processed, which are set so that in correspondence with each position of the dither matrix of the same configuration and the same size, a different dither processing is performed according to the result of determination of the segmentation class on part of the dither matrix and a same dither processing is performed irrespective of the result of determination of the segmentation class on a remainder of the dither matrix.

2. The image processing method according to claim 1, wherein
the pair of threshold values are selected according to whether the result of determination of the segmentation class is an edge area or not.

3. The image processing method according to claim 1, wherein
a pixel value which is a dither processing result of each position of the dither matrix of the same configuration and the same size with one threshold values is increased with a starting point which is the same position as the one with another threshold values irrespective of the result of determination of the segmentation class according to the value of the pixel to be processed.

4. The image processing method according to claim 3, wherein
when the result of determination of the segmentation class is an edge area, a pixel value of the starting point of the dither matrix of the same configuration and the same size is increased to a predetermined value according to the value of the pixel to be processed, and then, pixel values of other positions of the dither matrix are uniformly increased to the predetermined value.

5. The image processing method according to claim 3, wherein
when a plurality of dither matrices of the same configuration and the same size constitute a group and the result of determination of the segmentation class is an edge area, a pixel value of a predetermined starting point of the starting points of the dither matrices is increased to a predetermined value according to the value of the pixel to be processed, and then, pixel values of other starting point and other positions of the dither matrices are uniformly increased to the predetermined value.

6. The image processing method according to claim 5, wherein
the predetermined starting point is uniformly distributed.

7. The image processing method according to claim 3, wherein
when the result of determination of the segmentation class is not the edge area, a pixel value of the starting point of the dither matrix of the same configuration and the same size is increased to a predetermined value according to the value of the pixel to be processed, and then, pixel values of other positions of the dither matrix are increased to the predetermined value position by position.

8. The image processing method according to claim 1, wherein
tone correction is performed based on tone correction information common to pixels irrespective of the result of determination of the segmentation class.

9. The image processing method according to claim 1, wherein
to perform the dither processing, any of a plurality of pieces of data representative of relation between a pixel value before a dither processing and a pixel value after the dither processing is selected according to the result of determination of the segmentation class, and a value of the pixel to be processed is converted based on the selected piece of data representative of the relation, which pieces of data are set so that a different dither processing is performed according to the result of determination of the segmentation class on part of the dither matrix of the same configuration and the same size and a same dither processing is performed irrespective of the result of determination of the segmentation class on a remainder of the dither matrix.

10. An image processing method in which a dither processing using a dither matrix is performed based on a result of deter nation of a segmentation class to which a pixel to be processed belongs, the method comprising the steps of:
providing a computer having an image input apparatus, a storage section, a segmentation process section and an image output apparatus;
providing to the storage section an image comprising a plurality of pixels; in which a dither processing using a dither matrix is performed based on a result of
determination of segmenting the pixels into one or more a segmentation classes class to which a each pixel to be processed belongs;
selecting any of a plurality of dither matrices comprising a combination of different numbers of dither matrices of a same configuration and a same size according to the result of determination of the segmentation class; and
performing a different dither processing according to the result of determination of the segmentation class on part of the dither matrix of the same configuration and the same size included in the selected dither matrix,
wherein, to perform the dither processing, any of a plurality of pairs of threshold values is selected according to the result of determination of the segmentation class, and the selected pair of threshold values are compared with a value of the pixel to be processed, which are set so that in correspondence with each position of the dither matrix of the same configuration and the same size, a different dither processing is performed according to the result of determination of the segmentation class on part of the dither matrix and a same dither processing is performed irrespective of the result of determination of the segmentation class on a remainder of the dither matrix.

11. The image processing method according to claim 10, wherein
the pair of threshold values are selected according to whether the result of determination of the segmentation class is an edge area or not.

12. The image processing method according to claim 10, wherein
a pixel value which is a dither processing result of each position of the dither matrix of the same configuration and the same size with one threshold values is increased with a starting point which is the same position as the one with another threshold values irrespective of the result of determination of the segmentation class according to the value of the pixel to be processed.

13. The image processing method according to claim 12, wherein
when the result of determination of the segmentation class is an edge area, a pixel value of the starting point of the dither matrix of the same configuration and the same size is increased to a predetermined value according to the value of the pixel to be processed, and then, pixel values of other positions of the dither matrix are uniformly increased to the predetermined value.

14. The image processing method according claim 12, wherein
when a plurality of dither matrices of the same configuration and the same size constitute a group and the result of determination of the segmentation class is an edge area, a pixel value of a predetermined starting point of the starting points of the dither matrices is increased to a predetermined value according to the value of the pixel to be processed, and then, pixel values of other starting points and other positions of the dither matrices are uniformly increased to the predetermined value.

15. The image processing method according claim 14, wherein
the predetermined starting point is uniformly distributed.

16. The image processing method according to claim 12, wherein
when the result of determination of the segmentation class is not the edge area, a pixel value of the starting point of the dither matrix of the same configuration and the same size is increased to a predetermined value according to the value of the pixel to be processed, and then, pixel values of other positions of the dither matrix are increased to the predetermined value position by position.

17. The image processing method according claim 10, wherein
tone correction is performed based on tone correction information common to pixels irrespective of the result of determination of the segmentation class.

18. The image processing method according to claim 10, wherein
to perform the dither processing, any of a plurality of pieces of data representative of relation between a pixel value before a dither processing and a pixel value after the dither processing is selected according to the result of determination of the segmentation class, and a value of the pixel to be processed is converted based on the selected piece of data representative of the relation, which pieces of data are set so that a different dither processing is performed according to the result of determination of the segmentation class on part of the dither matrix of the same configuration and the same size and a same dither processing is performed irrespective of the result of determination of the segmentation class on a remainder of the dither matrix.

19. An image processing apparatus that performs a dither processing using a dither matrix based on a result of determination of a segmentation class to which a pixel to be processed belongs, the apparatus comprising:
a storage section that stores a plurality of pairs of threshold values that are set so that in correspondence with each position of a dither matrix of a same configuration and a same size;
a segmentation section for determining a segmentation class on a part of the dither matrix; and
a selection section that selects any of the pairs of threshold values stored in the storage section according to the result of determination of the segmentation class,
wherein to perform the dither processing, the pair of threshold values selected by the selection section are compared with a value of the pixel to be processed, and
wherein a dither processing is performed according to the result of determination of the segmentation class on part of the dither matrix and a same dither processing is performed irrespective of the result of determination of the segmentation class on a remainder of the dither matrix irrespective of a determination of the segmentation class on the remainder of the dither matrix.

20. An image processing apparatus that performs a dither processing using a dither matrix based on a result of determination of a segmentation class to which a pixel to be processed belongs, the apparatus comprising:
a storage section that stores a plurality of pieces of data representative of relation between a pixel value before a dither processing and a pixel value after the dither processing;
a segmentation section for determining a segmentation class on a part of the dither matrix; and
a selection section that selects any of the pieces of data representative of the relation stored in the storage section according to the result of determination of the segmentation class,
wherein to perform the dither processing, a value of the pixel to be processed is converted based on the piece of data representative of the relation selected by the selection section, and
wherein a dither processing is performed according to the result of determination of the segmentation class on part of the dither matrix of a same configuration and a same size and a same dither processing is performed irrespective of the result of determination of the segmentation class on a remainder of the dither matrix irrespective of a determination of the segmentation class on the remainder of the dither matrix.

21. An image forming apparatus comprising:
the image processing apparatus according to claim 19; and
an image output apparatus that forms an image processed by the image processing apparatus, on a sheet.

22. An image forming apparatus comprising:
the image processing apparatus according to claim 20; and
an image output apparatus that forms an image processed by the image processing apparatus, on a sheet.

23. A recording medium where a computer program is recorded for performing a dither processing using a dither matrix based on a result of determination of a segmentation class to which a pixel to be processed belongs, said computer program comprising the steps of:

causing a computer to select, according to the result of determination of the segmentation class, any of a plurality of pairs of threshold values that are set so that in correspondence with each position of a dither matrix of a same configuration and a same size, a different dither processing is performed according to the result of determination of the segmentation class on part of the dither matrix and a same dither processing is performed irrespective of the result of determination of the segmentation class a remainder of the dither matrix; and causing the computer to compare the selected pair of threshold values with a value of the pixel to be processed, to perform the dither processing.

24. A recording medium where a computer program is recorded for performing a dither processing using a dither matrix based on a result of determination of a segmentation class to which a pixel to be processed belongs, said computer program comprising the steps of:

causing a computer to select, according to the result of determination of the segmentation class, any of a plurality of pieces of data representative of relation between a pixel value before a dither processing and a pixel value after the dither processing which pieces of data are set so that a different dither processing is performed according to the result of determination of the segmentation class on part of a dither matrix of a same configuration and a same size and a same dither processing is performed irrespective of the result of determination of the segmentation class on a remainder of the dither matrix; and causing the computer to convert a value of the pixel to be processed based on the selected piece of data representative of the relation, to perform the dither processing.

* * * * *